(12) United States Patent
Fouad et al.

(10) Patent No.: US 11,871,388 B2
(45) Date of Patent: Jan. 9, 2024

(54) PRE-EMPTION, CONGESTION CONTROL, AND TX/RX ALIGNMENT FOR NR V2X UE WITH LIMITED POWER

(71) Applicant: Samsung Electronics Co., Ltd., Gyeonggi-do (KR)

(72) Inventors: Yaser Mohamed Mostafa Kamal Fouad, San Diego, CA (US); Jung Hyun Bae, San Diego, CA (US); Sili Lu, San Jose, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/992,413

(22) Filed: Nov. 22, 2022

(65) Prior Publication Data

US 2023/0079867 A1 Mar. 16, 2023

Related U.S. Application Data

(63) Continuation of application No. 17/410,585, filed on Aug. 24, 2021.
(Continued)

(51) Int. Cl.
*H04W 72/04* (2023.01)
*H04W 72/0446* (2023.01)
(Continued)

(52) U.S. Cl.
CPC ....... *H04W 72/0446* (2013.01); *H04W 72/20* (2023.01); *H04W 72/56* (2023.01);
(Continued)

(58) Field of Classification Search
None
See application file for complete search history.

(56) References Cited

U.S. PATENT DOCUMENTS 10,517,072 B2 12/2019 Patil et al.
10,834,641 B2 11/2020 Cai et al.
(Continued)

FOREIGN PATENT DOCUMENTS

WO WO 2018/145067 8/2018

OTHER PUBLICATIONS

3GPP TSG RAN Meeting #86, Sitges, Spain, Dec. 9-12, 2019, RP-193231, LG Electronics, New WID on NR sidelink enhancement.
(Continued)

*Primary Examiner* — Alex Skripnikov
*Assistant Examiner* — Pamit Kaur
(74) *Attorney, Agent, or Firm* — The Farrell Law Firm, P.C.

(57) ABSTRACT

A method and apparatus are provided for pre-emption, congestion control, and Tx/Rx alignment for use by a partial sensing UE. A method includes measuring resources within a first window; determining a number of the measured resources having an RSSI greater than a first threshold; determining a CBR based on the measured number of resources; and determining a CR limit based on the determined CBR and transmission priority. Determining the CBR based on the measured number of resources includes comparing a total number of measured resources within the first window to a second threshold; in response to the total number of measured resources being less than the second threshold, determining the CBR as a pre-configured CBR; and in response to the total number of measured resources being greater than or equal to the second threshold, determining the CBR based on a ratio of the number of the measured resources having the RSSI greater than the first threshold to the total number of measured resources within the first window.

18 Claims, 12 Drawing Sheets

Related U.S. Application Data

(60) Provisional application No. 63/171,376, filed on Apr. 6, 2021, provisional application No. 63/161,639, filed on Mar. 16, 2021, provisional application No. 63/127,497, filed on Dec. 18, 2020, provisional application No. 63/090,074, filed on Oct. 9, 2020, provisional application No. 63/089,762, filed on Oct. 9, 2020.

(51) Int. Cl.
  *H04W 76/28* (2018.01)
  *H04W 74/08* (2009.01)
  *H04W 72/20* (2023.01)
  *H04W 72/56* (2023.01)
  *H04W 4/40* (2018.01)

(52) U.S. Cl.
  CPC ....... *H04W 74/0808* (2013.01); *H04W 76/28* (2018.02); *H04W 4/40* (2018.02)

(56) References Cited

U.S. PATENT DOCUMENTS

| | | |
|---|---|---|
| 2018/0227943 A1 | 8/2018 | Xiao |
| 2018/0279094 A1 | 9/2018 | Blasco Serrano |
| 2020/0029245 A1 | 1/2020 | Khoryaev et al. |
| 2020/0037358 A1 | 1/2020 | Chae et al. |
| 2020/0053647 A1 | 2/2020 | Chae |
| 2020/0145967 A1 | 5/2020 | Park |
| 2021/0051526 A1 | 2/2021 | Cai et al. |
| 2021/0105768 A1* | 4/2021 | Nguyen ................ H04W 28/26 |
| 2021/0120564 A1* | 4/2021 | Lee .......................... H04W 4/40 |
| 2022/0394560 A1* | 12/2022 | Yu ..................... H04W 72/0446 |
| 2023/0066041 A1 | 3/2023 | Guo |

OTHER PUBLICATIONS

3rd Generation Partnership Project; Technical Specification Group Radio Access Network; NR; Physical layer procedures for data (Release 16) Jun. 2020.
3rd Generation Partnership Project; Technical Specification Group Radio Access Network; NR; Physical layer procedures for control (Release 16) Jun. 2020.
3rd Generation Partnership Project; Technical Specification Group Radio Access Network; NR; Multiplexing and channel coding (Release 16) Jun. 2020.
Intel Corporation, "Design of Resource Allocation Mode-2 for NR V2X Sidelink Communication", R1-1912205, 3GPP TSG WG1 Meeting #99, Nov. 18-22, 2019, 15 pages.
European Search Report dated Feb. 23, 2022 issued in counterpart application No. 21193988.9-1215, 9 pages.

\* cited by examiner

PRE-EMPTION, CONGESTION CONTROL, AND TX/RX ALIGNMENT FOR NR V2X UE WITH LIMITED POWER

PRIORITY

This application is a continuation of U.S. Ser. No. 17/410,585, which was filed in the United States Patent and Trademark Office (USPTO) on Aug. 24, 2021, and is based on and claims priority under 35 U.S.C. § 119(e) to U.S. Provisional Patent Application Nos. 63/171,376, 63/161,639, 63/127,497, 63/090,074, and 63/089,762, which were filed in the USPTO on Apr. 6, 2021, Mar. 16, 2021, Dec. 18, 2020, Oct. 9, 2020, and Oct. 9, 2020, respectively, the entire content of each of which is incorporated herein by reference.

FIELD

The present disclosure relates generally to new radio (NR) vehicle-to-everything (V2X) enhancement, and more particularly, to techniques for pre-emption, congestion control, and transmission (Tx)/reception (Rx) alignment for use by user equipments (UEs) with limited power.

BACKGROUND

In NR V2X, Mode 2 resource selection can be used by UEs to select resources for transmission. Generally, this is two-step procedure in which 1) a UE senses the channel to find free (not-reserved) resources, and 2) the UE selects resources based on sensing results.

In Mode 2, a UE establishes a sensing window and a resource selection window. In the sensing window, all UEs that are not transmitting are required to monitor all subchannels in order to detect sidelink control information (SCI) transmitted by their neighbors. Once SCI is detected, its reference signal received power (RSRP) is measured and a set of resources can be considered as occupied in future slots (within the resource selection window) based on the measurement. SCI can indicate up to two future resources (i.e., subchannels and slots) as well as a periodicity for periodic transmissions.

Subsequently, a sensing UE can identify a set of resources that are occupied in its resource selection window in order to avoid these resources. However, despite the advantages of this conventional procedure in reducing collisions (i.e., interference), it still requires each UE to continuously monitor all subchannels in order to identify the occupied resources, thus consuming large amounts of power.

While such high power consumption may be acceptable for vehicle UEs, which often have an abundant power source, it is not usually feasible for pedestrian UEs (PUEs), which have a limited power budget. For example, PUEs are expected to sleep for extended durations in order to preserve power and then wake up to perform a transmission, thus having limited or no sensing capability. Herein, the terms such as "PUE" and "limited-power UE" may be used interchangeably.

A similar behavior has been observed in long-term evolution (LTE), and consequently, the resource selection procedure therein was updated to include partial sensing and random resource selection in order to preserve power. However, despite the possible advantages of random resource selection and partial sensing for LTE, these methods offer limited protection against collisions between neighboring UEs. Consequently, they are not favorable for NR V2X applications, which are expected to have stricter reliability and latency requirements as compared to their LTE-based counterparts.

In addition, unlike LTE, NR PUEs are expected to receive messages from their neighboring UEs, and thus, are expected to be listening when other PUEs are transmitting.

In particular, multiple applications are emerging for NR sidelink (SL) that require power saving. These applications are targeted for use by PUEs as well as for use by UEs for public safety and commercial uses (e.g., in a smart home, a smart factory, etc.). In these applications, it may be important for neighboring UEs to exchange information while utilizing power saving techniques to preserve their limited power source (e.g., by using partial sensing or random resource selection). However, if the exact partial sensing/random selection procedures of LTE are used, there would be no guarantee that Tx and Rx sensing and resource selection windows are aligned, thus offering no guarantee on a UE's ability to reach its neighbors. Essentially, the random resource selection and partial-sensing based resource selection techniques of LTE are not readily applicable to NR V2X because: 1) LTE was designed with only periodic traffic in mind, and thus the partial sensing technique does not attempt to avoid collisions with aperiodic traffic; 2) LTE assumes that UEs with limited power will be only transmitting and not receiving, and thus there is no need for Tx and Rx alignment; 3) NR V2X has more stringent reliability and latency constraints than those of LTE; and 4) coexistence between full sensing and power saving UEs was limited to avoid collisions.

Accordingly, a need exists for techniques that allow a UE to use partial sensing and random resource selection to save limited power, while still avoiding collisions with neighboring UEs.

SUMMARY

Accordingly, the present disclosure is designed to address at least the problems and/or disadvantages described above and to provide at least the advantages described below.

An aspect of the disclosure is to provide techniques for Tx and Rx alignment to allow information exchange and mass pre-emption.

Another aspect of the disclosure is to provide pre-emption and resource reselection enhancements.

Another aspect of the disclosure is to provide techniques for wake-up/sleep (WUS) signaling.

Another aspect of the disclosure is to enhance resource exclusion due to hypothetical SCI.

Another aspect of the disclosure is to provide rules for coexistence between power saving and full sensing UEs.

Another aspect of the disclosure is to provide updated congestion control metrics of LTE for use in partial sensing.

In accordance with an aspect of the disclosure, a method is provided for a partial sensing UE. The method includes measuring resources within a first window; determining a number of the measured resources having a received signal strength indication (RSSI) greater than a first threshold; determining a channel busy ratio (CBR) based on the measured number of resources; and determining a channel occupancy ratio (CR) limit based on the determined CBR and transmission priority. Determining the CBR based on the measured number of resources includes comparing a total number of measured resources within the first window to a second threshold; performing at least one of (a) or (b): (a) in response to the total number of measured resources within the first window being less than the second threshold, determining the CBR as a pre-configured CBR, and (b) in response to the total number of measured resources within the first window being greater than or equal to the second threshold, determining the CBR based on a ratio of the number of the measured resources having the RSSI greater than the first threshold to the total number of measured resources within the first window.

In accordance with another aspect of the disclosure, a partial sensing UE is provided. The partial sensing UE includes a transceiver; and a processor configured to measure resources within a first window; determine a number of the measured resources having an RSSI greater than a first threshold; determine a CBR based on the measured number of resources; and determine a CR limit based on the determined CBR and transmission priority. The processor is further configured to determine the CBR based on the measured number of resources by comparing a total number of measured resources within the first window to a second threshold; and performing at least one of (a) or (b): (a) in response to the total number of measured resources within the first window being less than the second threshold, determining the CBR as a pre-configured CBR, and (b) in response to the total number of measured resources within the first window being greater than or equal to the second threshold, determining the CBR based on a ratio of the number of the measured resources having the RSSI greater than the first threshold to the total number of measured resources within the first window.

In accordance with another aspect of the disclosure, a partial sensing UE is provided. The partial sensing UE includes a processor; and a non-transitory computer readable storage medium storing instructions that, when executed, cause the processor to measure resources within a first window; determine a number of the measured resources having an RSSI greater than a first threshold; determine a CBR based on the measured number of resources; and determine a CR limit based on the determined CBR and transmission priority. The instructions, when executed, further cause the processor to compare a total number of measured resources within the first window to a second threshold; and perform at least one of (a) or (b): (a) in response to the total number of measured resources within the first window being less than the second threshold, determine the CBR as a pre-configured CBR, and (b) in response to the total number of measured resources within the first window being greater than or equal to the second threshold, determine the CBR based on a ratio of the number of the measured resources having the RSSI greater than the first threshold to the total number of measured resources within the first window.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
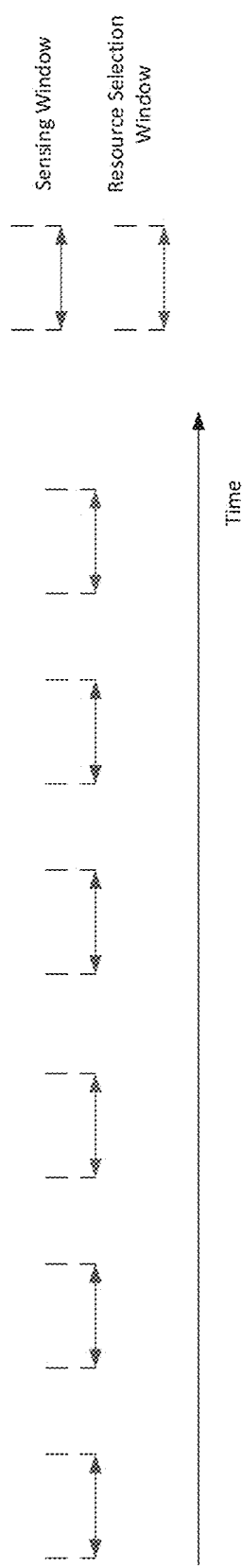
FIG. 1 illustrates a timeline providing an example of partial sensing.

Hereinafter, various embodiments of the disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to an embodiment may be one of various types of electronic devices. The electronic devices may include, for example, a portable communication device (e.g., a smart phone), a computer, a portable multimedia device, a portable medical device, a camera, a wearable device, or a home appliance. According to an embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, a module may be implemented in a form of an application-specific integrated circuit (ASIC).

In NR V2X, Mode 2 resource selection is a distributed procedure that allows UEs to select their resources independently from a gNB. Mode 2 resource selection is generally a 2-step procedure: 1) a UE senses the channel to find free (not-reserved) resources; and 2) a UE selects resources based on sensing results. In this procedure, UEs rely on continuous sensing to identify occupied resources by their neighbors and accordingly select unoccupied resources for their future transmissions. However, continuous sensing has been shown to consume significant power, and thus, is not suitable for PUEs.

FIG. 1 illustrates a timeline providing an example of partial sensing.

Partial sensing was developed for UEs having power consumption limits. It was standardized for LTE and is being standardized for NR. However, these procedures are not currently adopted in NR V2X.

Further, partial sensing was developed for LTE, which is dominated by periodic traffic, and thus, not readily applicable for NR that can accommodate aperiodic traffic.

To address the drawbacks above, a work item (WI) discussion was initiated for NR V2X Rel-17 to make it more adaptable to power limited devices. In particular, the following WI was suggested in RAN meeting #86:

Resource allocation enhancement:
  Specify resource allocation to reduce power consumption of the UEs [RAN1, RAN2]
    Baseline is to introduce the principle of Rel-14 LTE sidelink random resource selection and partial sensing to Rel-16 NR sidelink resource allocation mode 2.
    Note: Taking Rel-14 as the baseline does not preclude introducing a new solution to reduce power consumption for the cases where the baseline cannot work properly.

However, despite the advantages of random resource selection and partial sensing, they offer limited protection against collisions between neighboring UEs. Subsequently, if LTE V2X partial sensing and random resource selection are applied directly, they might not be favorable for NR V2X applications which are expected to require more strict reliability and latency when compared to their LTE-based counterparts.

In addition, unlike LTE, NR power-limited UEs are expected to receive messages from their neighboring UEs, and thus, they are expected to be listening when others are transmitting.

More specifically, multiple applications are emerging for NR SL that require power saving. In these applications, it is important that neighboring UEs exchange information while utilizing power saving techniques to preserve their limited power source (e.g., by using partial sensing or random resource selection). Hence, if the exact partial sensing/random selection procedures of LTE are used there would be no guarantee that Tx and Rx sensing and resource selection windows are aligned, thus offering no guarantee on the UE's ability to reach its neighbors.

1. Mode 2 Resource Allocation in NR Rel-16

In resource allocation Mode 2, a higher layer can request a UE to determine a subset of resources from which the higher layer will select resources for physical sidelink shared channel (PSSCHYphysical sidelink control channel (PSCCH) transmission. To trigger this procedure, in slot n, the higher layer provides the following parameters for this PSSCH/PSCCH transmission:
  the resource pool from which the resources are to be reported;
  L1 priority, $\text{prio}_{TX}$;
  the remaining packet delay budget;
  the number of sub-channels to be used for the PSSCH/PSCCH transmission in a slot, $L_{subCH}$; and
  optionally, the resource reservation interval, $P_{rsvp\_TX}$, in units of ms.

The following higher layer parameters affect this procedure:
  t2min_SelectionWindow: internal parameter $T_{2min}$ is set to the corresponding value from higher layer parameter t2min_SelectionWindow for the given value of $\text{prio}_{TX}$.
  SL-ThresRSRP_pi_pj: this higher layer parameter provides an RSRP threshold for each combination ($p_i$, $p_j$), where $p_i$ is a value of the priority field in a received SCI format 0-1 and $p_j$ is a priority of the transmission of the UE selecting resources; for a given invocation of this procedure, $p_j = \text{prio}_{TX}$.

RSforSensing selects if the UE uses the PSSCH-RSRP or PSCCH-RSRP measurement, as defined in subclause 8.4.2.1.

reservationPeriodAllowed t0_SensingWindow: internal parameter $T_0$ is defined as the number of slots corresponding to t0_SensingWindow ms.

The resource reservation interval, $P_{rsvp\_TX}$, if provided, is converted from units of ms to units of logical slots, resulting in $P'_{rsvp\_TX}$, and $(t_0^{SL}, t_1^{SL}, t_2^{SL}, \dots)$ denotes the set of slots which can belong to a sidelink resource pool.

Figure 2:
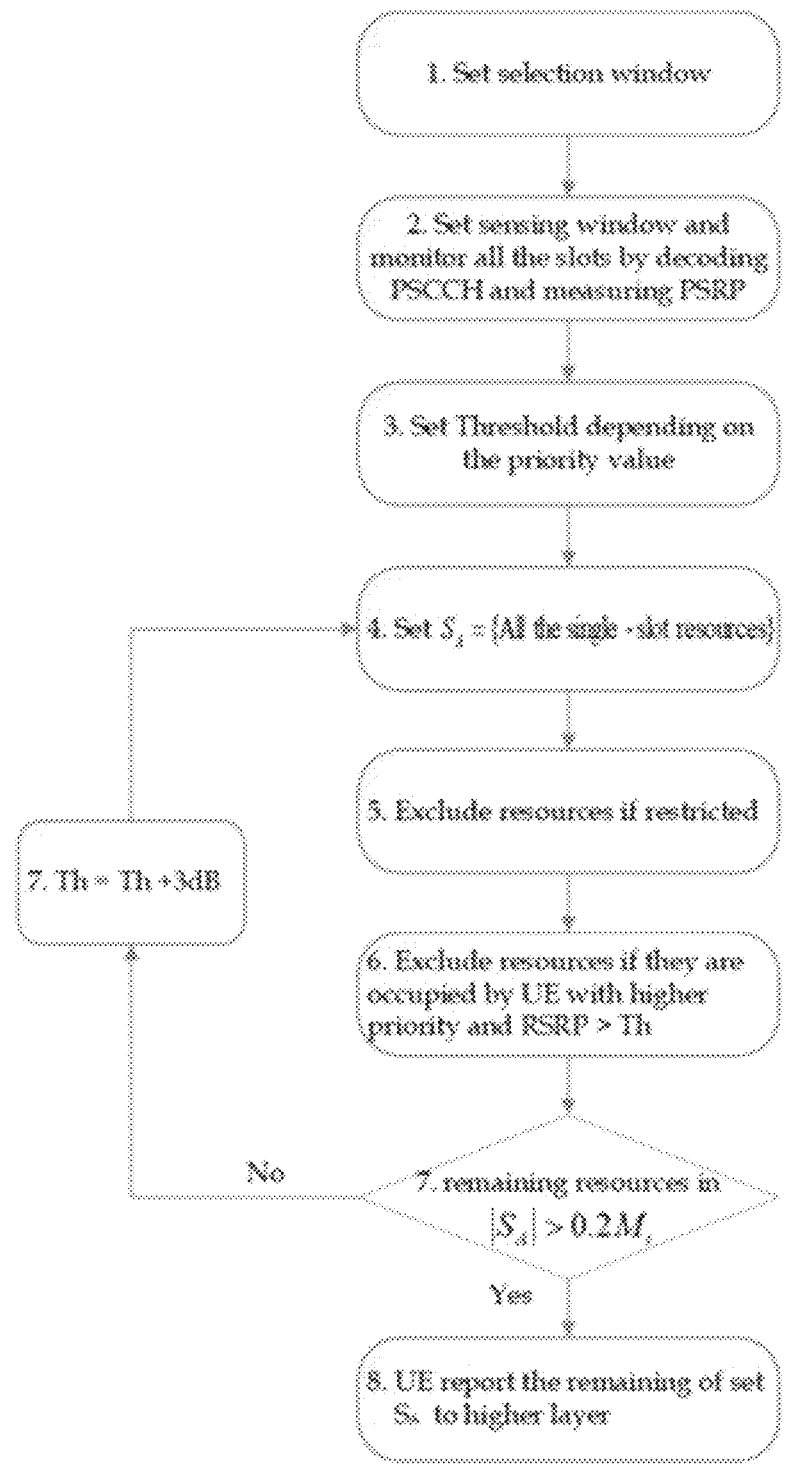
FIG. 2 is flowchart illustrating a Mode 2 resource selection procedure.

FIG. 2 is flowchart illustrating a Mode 2 resource selection procedure.

Referring to FIG. 2:

Step 1. A candidate single-slot resource for transmission $R_{x,y}$ is defined as a set of $L_{subCH}$ contiguous sub-channels with sub-channel $x+j$ in slot $t_y^{SL}$, where $j=0, \dots, L_{subCH}-1$. The UE shall assume that any set of $L_{subCH}$ contiguous sub-channels included in the corresponding resource pool within the time interval $[n+T_1, n+T_2]$ correspond to one candidate single-slot resource, where selection of $T_1$ is up to UE implementation under $0 \leq T_1 \leq T_{proc,1}$, where $T_{proc,1}$ is TBD; If $T_{2min}$ is shorter than the remaining packet delay budget (in slots) then $T_2$ is up to UE implementation subject to $T_{2min} \leq T_2 \leq$ remaining packet budget (in slots), otherwise $T_2$ is set to the remaining packet delay budget (in slots). The total number of candidate single-slot resources is denoted by $M_{total}$.

Step 2. The sensing window is defined by the range of slots $[n-T_0, n-T_{proc,0})$, where $T_0$ is defined above and $T_{proc,0}$ is TBD. The UE shall monitor slots which can belong to a sidelink resource pool within the sensing window except for those in which its own transmissions occur. The UE shall perform the behavior in the following steps based on the decoded PSCCH and the measured RSRP in these slots.

Step 3. The internal parameter $Th(p_i)$ is set to the corresponding value from higher layer parameter SL-ThresRSRP_pi_pj for $p_j$ equal to the given value of $\text{prio}_{TX}$ and each priority value $p_i$.

Step 4. The set $S_A$ is initialized to the set of all the candidate single-slot resources.

Step 5. The UE shall exclude any candidate single-slot resource $R_{x,y}$ from the set $S_A$ if it meets all the following conditions:

a. The UE has not monitored slot $t_m^{SL}$ in Step 2.

b. For any periodicity value allowed by the higher layer parameter reservationPeriodAllowed and a hypothetical SCI format 0-1 received in slot $t_m^{SL}$ with "Resource reservation period" field set to that periodicity value and indicating all subchannels of the resource pool in this slot, condition c in Step 6 would be met.

Step 6. The UE shall exclude any candidate single-slot resource $R_{x,y}$ from the set $S_A$ if it meets all the following conditions:

a. the UE receives an SCI format 0-1 in slot $t_m^{SL}$, and "Resource reservation period" field, if present, and "Priority" field in the received SCI format 0-1 indicate the values $P_{rsvp\_RX}$ and $\text{prio}_{RX}$, respectively;

b. the RSRP measurement performed, according to received SCI format 0-1, is higher than $Th(\text{prio}_{RX})$;

c. the SCI format received in slot $t_m^{SL}$ or the same SCI format which, if and only if the "Resource reservation period" field is present in the received SCI format 0-1, is assumed to be received in slot(s) $t_{m+q \times P'_{rsvp\_RX}}^{SL}$ determines the set of resource blocks and slots which overlaps with $R_{x,y+j \times P'_{rsvp\_TX}}$ for $q=1, 2, \dots, Q$ and $j=0, 1, \dots, C_{reset}-1$. Here, $P'_{rsvp\_RX}$ is $P_{rsvp\_RX}$ converted to units of logical slots, $$Q = \left\lceil \frac{T_{scal}}{P'_{rsvp\_RX}} \right\rceil$$

if $P_{rsvp\_RX} < T_{scal}$ and $n' - m \leq P'_{rsvp\_RX}$, where $t_{n'}^{SL} = n$ if slot n belongs to the set $(t_0^{SL}, t_1^{SL}, \dots, t_{T_{max}}^{SL})$, otherwise slot $t_{n'}^{SL}$ is the first slot after slot n belonging to the set $(t_0^{SL}, t_1^{SL}, \dots, t_{T_{max}}^{SL})$; otherwise $Q=1$. $T_{scal}$ is TBD.

Step 7. If the number of candidate single-slot resources remaining in the set $S_A$ is smaller than $0.2 \cdot M_{total}$, then $Th(p_i)$ is increased by 3 dB for each priority value $Th(p_i)$ and the procedure continues with Step 4.

Step 8. UE shall report remaining of set $S_A$ to higher layers, and high layer then randomly selects a candidate resource for transmission.

2. Partial-Sensing/Random Based Mode 2 Resource Selection Procedure in LTE V2X

If partial sensing is configured by higher layers then the following steps are used:

1) A candidate single-subframe resource for PSSCH transmission $R_{x,y}$ is defined as a set of $L_{subCH}$ contiguous sub-channels with sub-channel $x+j$ in subframe $t_y^{SL}$, where $j=0, \dots, L_{subCH}-1$. The UE shall determine by its implementation a set of subframes which consists of at least Y subframes within the time interval $[n+T_1, n+T_2]$, where selections of $T_1$ and $T_2$ are up to UE implementations under $T_1 \leq 4$ and $T_{2min}(\text{prio}_{TX}) \leq T_2 \leq 100$, if $T_{2min}(\text{prio}_{TX})$ is provided by higher layers for $\text{prio}_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$, if k-th bit of the high layer parameter gapCandidateSensing is set to 1. The UE shall perform the behavior in the following steps based on PSCCH decoded and S-received signal strength indication (RSSI) measured in these subframes.

3) The parameter $Th_{a,b}$ is set to the value indicated by the i-th SL-ThresPSSCH-RSRP field in SL-ThresPSSCH-RSRP-List where $i=a*8+b+1$.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

1.—the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Sub-clause 14.2.1.
2. —PSSCH-RSRP measurement according to the received SCI format 1 is higher than $Th_{prio_{TX},prio_{RX}}$.
3.—the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P'_{rsvp\_RX}}$ for q=1, 2, ..., Q and j=0, 1, ..., $C_{reset}$−1. Here, $$Q = \frac{1}{P_{rsvp\_RX}}$$

if $P_{rsvp\_Rx}$<1 and y'−m≤$P_{step} \times P_{rsvp\_RX}$+step, where $t_y^{SL}$ is the last subframe of the Y subframes, and Q=1 otherwise.

6) If the number of candidate single-subframe resources remaining in the set $S_A$ is smaller than 0.2·$M_{total}$, then Step 4 is repeated with $Th_{a,b}$ increased by 3 dB.

7) For a candidate single-subframe resource $R_{x,y}$ remaining in the set$S_A$, the metric $E_{x,y}$ is defined as the linear average of S-RSSI measured in sub-channels x+k for k=0, ..., $L_{subCH}$−1 in the monitored subframes in Step 2 that can be expressed by $t_{y-P_{step}*j}^{SL}$ for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2 $M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for radio frequency (RF) retuning time. The UE shall report set $S_B$ to higher layers.

When transmission based on random selection is configured by upper layers and the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub-channels with sub-channel x+j in subframe $t_y^{SL}$, where j=0, ..., $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1$≤4 and $TTX_{2_{min}}$, if $TTX_{2min}$ is provided by higher layers for $prio_{TX}$, otherwise 20≤$T_2$≤100. UE selection of $T_2$ shall fulfil the latency requirement. The total number of the candidate single-subframe resources is denoted by $M_{total}$.

2) The set $S_A$ is initialized to the union of all the candidate single-subframe resources. The set $S_B$ is initialized to an empty set.

3) The UE moves the candidate single-subframe resource $R_{x,y}$ from the set $S_A$ to $S_B$.

4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time. The UE shall report set $S_B$ to higher layers.

3. Tx and Rx Alignment for Partial Sensing UEs

In the Rel-17 sidelink enhancement WI, unlike its LTE rival, multiple applications are emerging that require power saving. These applications are targeted for PUEs, and also for UEs in public safety and commercial use cases (e.g., smart homes, smart factories, etc.). In these applications, it is important for both transmitters and receivers to utilize power saving techniques to preserve their limited power source (e.g., by using partial sensing or random resource selection). Further, enhancements for sensing pattern alignment are needed to allow for bi-directional communications. In other words, for partial sensing, it is important to align the resource selection window of the Tx UE with the receiving window of the neighboring Rx UEs in order to allow the exchange of transport blocks (TBs) between the UEs. This alignment naturally exists for full sensing UEs, which have a continuous receiving window, i.e., all slots are monitored for potential TB reception unless a UE is transmitting.

In accordance with an embodiment of the disclosure, to achieve alignment, the following techniques are provided:

Technique 1:

Unlike in Rel-16 NR V2X, in Rel-17 it is prospected that some UEs (e.g., PUEs) will not be continuously monitoring all subchannels in order to save power. These UEs can either monitor some slots, or in some cases, only a subset of subchannels in some of the slots, e.g., similar to the partial sensing procedure in LTE V2X Rel-14. This partial sensing procedure is mainly aimed towards reducing the power consumption by allowing a UE to turn off its RF circuitry. Despite its advantages, this procedure introduces a new challenge as it requires time alignment between UEs in order to be able to exchange information. To address this drawback, a set of slots are defined, during which all UEs are mandated to be in the receiving mode. That is, mandatory slots are identified in which all UEs are required to be monitoring for alignment. By using these mandatory slots UEs are able to acquire Tx and Rx alignment information.

Before describing this procedure in more detail, the following three windows are described:

a. Receiving window: A UE is active and monitoring the resources for potential packet transmissions by its neighbors.

b. Sensing window: The UE is monitoring the resources for potential packet transmissions and also identifying the resources that are reserved by its neighboring UEs in the future (e.g., the future reservations indicated in the SCIs). The sensing window can overlap with the receiving window as the sensing can be considered as a subset of the receiving process. That is, the sensing involves decoding the SCI information which is also part of the receiving process.

c. Resource selection window: The UE identifies a set of potential candidate resources that can be used to transmit its TB. This set is passed to the higher layers for selection. The candidate resources are selected based on the information obtained in the sensing window.

In accordance with an embodiment of the disclosure, a method for using mandatory slots for Tx and Rx alignment can be summarized as follows:

First, a set of slots are identified and are required to be monitored by all UEs (referred to herein as the mandatory slots) either per bandwidth part (BWP), per resource pool, or a combination thereof. These resources can also be pre-configured per resource pool or per BWP. In addition, the mandatory slots can be set as one or more resource pools. In this case, UEs will be required to stay awake during these resource pools. Alternatively, the mandatory slots can be set as a specific subset of a resource pool (e.g., the first X slots of a resource pool). In the mandatory slots, Tx and Rx alignment information will be sent, and thus, all the UEs are to be active and in the receiving mode in order to acquire this information.

Alternatively, the UEs may be required to monitor only a subset of the sidelink subchannels in the mandatory slots in order to further preserve power.

The mandatory slots can also be periodic to reduce the signaling overhead. The number and frequency of occurrence of these slots can depend on the CBR and the monitored traffic priorities.

To further reduce the power consumption for monitoring the mandatory slots, these slots can also be divided into multiple categories, whereby a first category must be monitored by all UEs and following categories can be monitored by more capable UEs. A UE's capability can be signaled to neighboring UEs either in the PSCCH/physical sidelink feedback channel (PSFCH) or indicated via MAC control element (CE) in the PSSCH.

Figure 3:
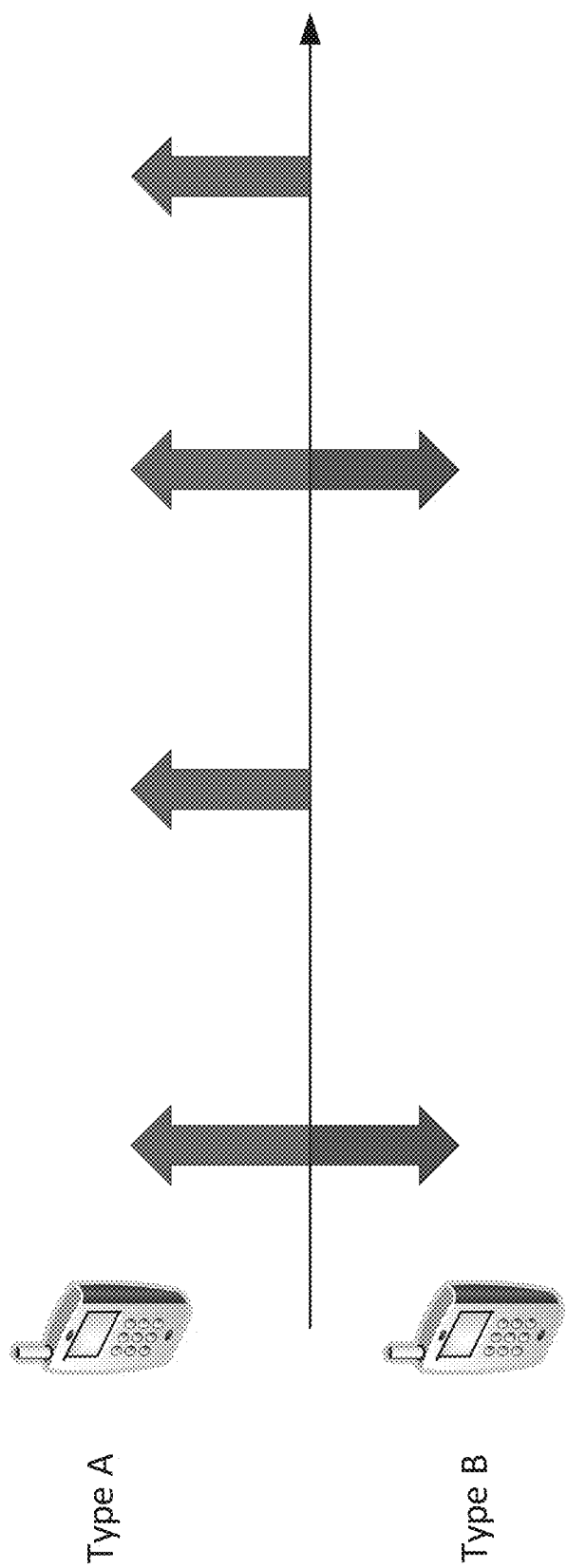
FIG. 3 illustrates an example of UEs monitoring different numbers of mandatory slots depending on respective UE capabilities, according to an embodiment.

FIG. 3 illustrates an example of UEs monitoring different numbers of mandatory slots depending on respective UE capabilities, according to an embodiment.

As illustrated in FIG. 3, a Type A UE is capable of monitoring 4 mandatory slots, while a Type B UE is only capable of monitoring 2 mandatory slots over the same time period.

Using the mandatory slots, a 2-step procedure is provided to align the Tx and Rx UEs. In particular, in the first step, alignment information is sent in the mandatory slots and specifies the location and length of the receiving, sensing, and resource selection windows. Once this information is obtained, each UE within the area can: 1) select its candidate resources for potential transmission; 2) identify the sensing window over which it should detect the SCIs to figure out the occupied resources; and 3) identify the receiving window in which it should be active and receiving data from its neighboring UEs.

In the mandatory slots, either a full sensing UE, a super UE (e.g., a road side unit (RSU), a gNB, a cluster head, etc.), or a UE providing the sync source can send information regarding the receiving, sensing, and resource selection windows. Alternatively, it can only provide information about the receiving window only, whereby the resource selection and the sensing windows can be selected as subsets of the receiving window by each UE individually.

Figure 4:
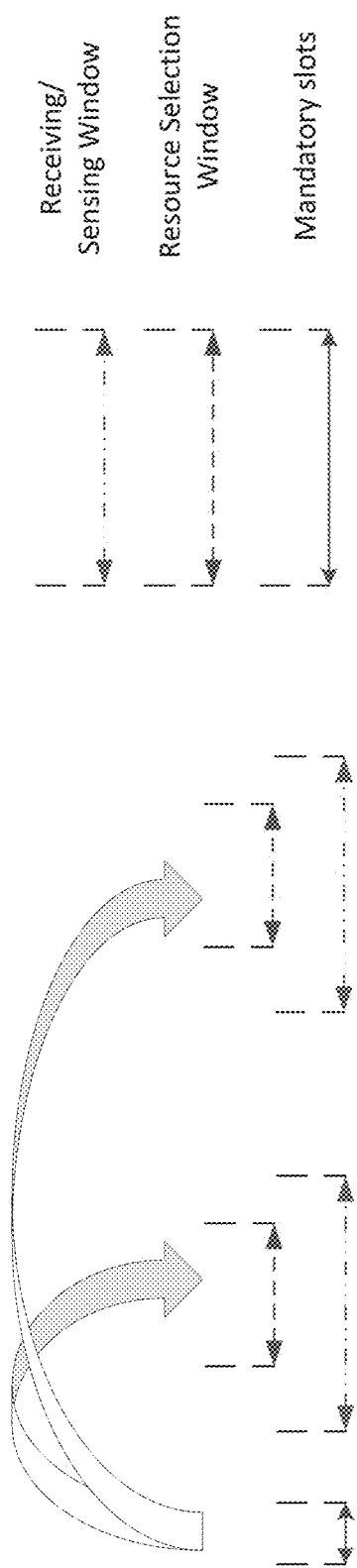
FIG. 4 illustrates an example in which a mandatory slot is used to indicate locations of receiving, sensing, and selection windows, according to an embodiment.

FIG. 4 illustrates an example in which a mandatory slot is used to indicate locations of receiving, sensing, and selection windows, according to an embodiment.

As illustrated in FIG. 4, the receiving and sensing windows are selected to be identical.

Alternatively, the selection of the resource selection window for each UE can be up to UE implementation. In other words, each UE can select its resource selection independently after obtaining the information about the other UEs' sensing and receiving windows in the mandatory slot(s).

A full sensing UE that performs alignment can be proactively activated (e.g., randomly), can be selected by the RSU or gNB, or can only be limited to being either an RSU or a gNB if present in the area.

When more information should be sent for alignment (e.g., to specify more than one sensing and resource selection window), the number of mandatory slots can be extended in the current period (when periodic) by signaling in the first mandatory slot. For example, the super UE can indicate in the first mandatory slots that additional mandatory slots for this period will exist. This can be done by using an SCI and reserving future resources or by sending a MAC CE in the PSSCH. Examples of the information to be sent include one or more receiving, sensing, and resource selection windows. This information can be provided per priority. The indicated receiving, sensing and resource selection windows can be selected to be periodic in order to reduce the overhead.

Alternatively, to reduce the signaling overhead, longer receiving, sensing, and resource selection windows can be signaled (i.e., having one longer receiving window instead of multiple short windows to reduce the signaling overhead). A longer window can be signaled by SCI or a MAC CE in the PSSCH. However, this overhead reduction comes at the expense of longer latency as the UE will have to wait until a next window to be able to transmit.

Additionally, the signaled sensing windows can be associated with specific priority levels. For example, one receiving/sensing window can be given higher priority, and thus, it should be monitored by all UEs, whereas another receiving/sensing window can be associated with a lower priority level, and thus, may or may not be monitored by all UEs to reduce the power consumption.

Sizes of the signaled windows can be selected based on the CBR, the number of sensed UEs, or the traffic priority in order to reduce the collision probability. In particular, the larger the number of active UEs and the higher their traffic priority will result in longer sensing and resource selection windows to allow for more resources for selection. To ensure that all UEs can reach one another, the selected sensing and resource selection windows may be aligned and overlapped as illustrated in FIG. 5.

Figure 5:
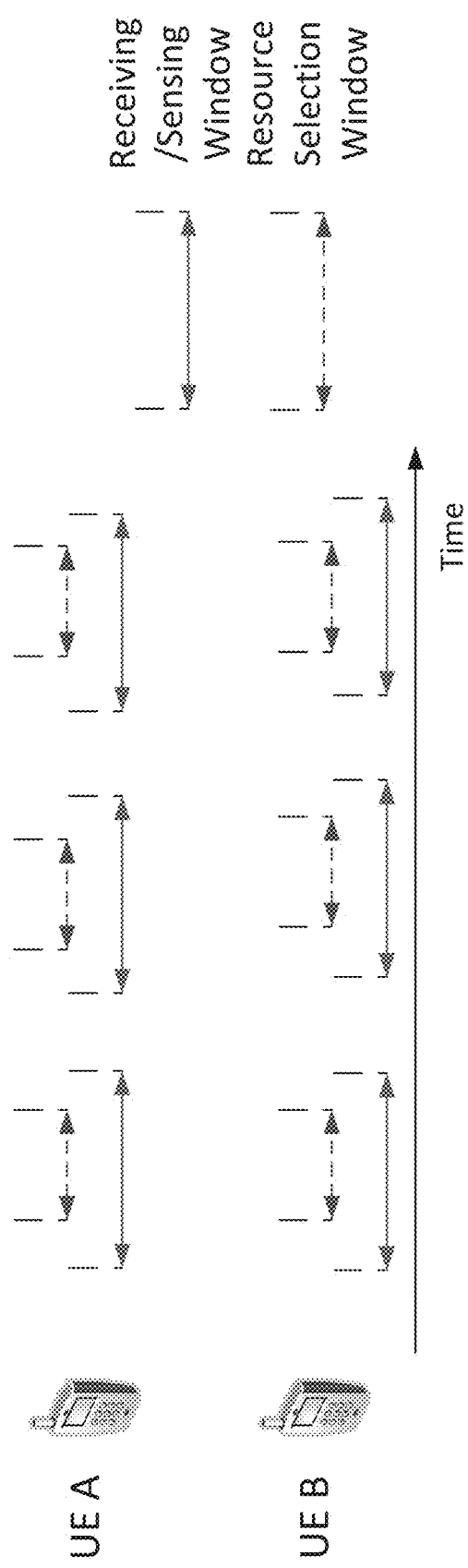
FIG. 5 illustrate alignment between sensing and resource selection windows of neighboring UEs, according to an embodiment.

FIG. 5 illustrate alignment between sensing and resource selection windows of neighboring UEs, according to an embodiment.

As illustrated in FIG. 5, the receiving and sensing windows are selected to be identical.

To further utilize the benefits of the mandatory slots, the mandatory slots may also be used to indicate the following:

a. In case of random resource selection, the mandatory slots can be used by the super UE to provide information about a receiving window to be monitored by all random resource selection UEs in order to receive the transmitted messages. This receiving window can be different than that for UEs using partial sensing and can also be periodic. In addition, all random resource selection UE transmissions or random transmissions with a given priority can be restricted to be transmitted during the receiving window selected for the random resource selection UEs, the receiving window selected for partial sensing UEs, or a combination thereof, to ensure that the message can be received. The length of the receiving window can also be increased as the system becomes more occupied to reduce the chances of collisions (e.g., when the CBR is above a certain threshold).

b. The super UE performing the alignment can also forward the information in case of high priority traffic in the slots that need to be monitored to ensure that the high priority traffic can be reached by all of the UEs in the area.

c. The super UE can also use a mandatory slot to initiate a mass pre-emption. In particular, all UEs within the same geographical area can be pre-empted for a given window. This may be specifically helpful when high priority packets are to be transmitted (e.g., emergency vehicle approaching intersection and want to request other vehicles to stop for it to pass). Alternatively, mass pre-emption can be used to target only a subset of the UEs (e.g., one or more categories) or also for transmission with priority lower than a threshold.

d. Mandatory slots can be used to send discontinuous reception (DRX) information by the super UE, which helps in aligning the DRX cycles of neighboring UEs within the area, in order to ensure that the super UE and the neighboring UEs can exchange information. This may be especially helpful for use in groupcast and/or broadcast in which it is not straightforward to exchange the DRX information between neighboring UEs due to the connectionless mode of operation. This can also help reduce overhead in aligning unicast transmissions of neighboring UEs. For example, one DRX alignment message by the super UE can complete the alignment for many unicast transmissions within one area.

As described above, according to Technique 1, all UEs may be mandated to monitor one or more slots per resource pool or per BWP. As such, these slots can be used to align the transmissions/receptions of all UEs within a geographical area.

Additionally, a full sensing/super UE may be allowed to transmit alignment information (between sensing and selection windows of neighboring UEs in case of partial sensing or a sensing window in case of random selection) in these alignment slots. The UE can also use these slots to retransmit high priority traffic to ensure that it will reach all UEs within a geographical area.

The full sensing/super UE may also use mandatory slots to provide alignment information for UEs performing random resource selection, to ensure that they can also be reached and able to exchange information.

Further, the full sensing/super UE may request mass pre-emption to allow for higher priority transmissions to be successfully transmitted. Further, mass-preemption can also target a subset of UEs or UE transmissions with priority below a certain threshold.

The full sensing/super UE may also send DRX alignment information in the mandatory slots in order to reduce overhead and facilitate an exchange of TBs between neighboring UEs.

Technique 2:

To reduce complexity of the 2-step procedure for Tx and Rx alignment described above, all UEs may transmit and receive in the mandatory slots (unlike the previous procedure, which mandated that all UEs, except the super UE, will only receive during the mandatory slots). In particular, for each resource pool, a set of mandatory slots can be pre-configured. These slots can be periodic, e.g., with a periodicity that depends on the CBR and a priority of the transmitted traffic. The number of these slots can also depend on the UE traffic priority (e.g., the number of accessible slots per period in case of periodic can be increased for higher priorities). This helps reduce collision with higher priority UEs.

In addition, the number of mandatory slots per period (in case of periodic) can also increase with CBR (i.e., the higher the CBR value, the larger the number of mandatory slots) in order to reduce the chances of collisions.

For non-periodic mandatory slots, the number of configured mandatory slots per resource pool can still be dynamically chosen based on the priority and the CBR. In these mandatory slots, all partial sensing UEs can be required to be in the receiving mode unless they are transmitting. That is, these mandatory slots can be considered as a part of the sensing/receiving window for these UEs.

In some cases, the receiving and sensing windows within the mandatory slots can be equal to each other. Further, the receiving and sensing windows can be equal to or a subset of the DRX ON duration (either the full DRX ON duration or a shared part of the DRX ON duration). In particular, if a UE is expected to receive and sense for the complete duration in which it is ON or a predefined duration of its ON time, then the DRX ON and the mandatory slots are either totally or partially overlapping (i.e., the DRX and the mandatory slots share the same objective and can share the same configuration). In particular, the mandatory slots can be equal to the full DRX ON duration or a shared part of the DRX ON duration and a mandatory slot configuration can be derived from the DRX configuration. For example, the mandatory slots can be selected to be either the full DRX ON duration, if all DRX cycles are the same for all UEs (e.g., UEs within a given region or UEs using the same resource pool) or the first X slots within the DRX ON duration that is shared among all UEs (i.e., UEs within a given region or UEs using the same resource pool) and during this time all UEs are expected to be sensing or sensing/receiving, if not transmitting.

Alternatively, the receiving duration can be a subset of the sensing duration in order to save power, since sensing consumes less power than receiving. In some cases, the sensing duration can be equal to the DRX ON duration (i.e., the UE is always sensing if it is on).

Subsequently, the DRX and the mandatory slots become essentially the same and the shared DRX configuration can be used to obtain the mandatory slots configuration. For example, if all DRX cycles are identical for all UEs (i.e., all UEs within a certain region or using the same resource pool share the same DRX configuration) then the mandatory slots can be obtained from the DRX configuration. Alternatively, the mandatory slots can be equal to the shared part of the DRX On duration that is common between all UEs within an area.

In addition, the resource selection and sensing windows can also be selected to be a subset of these mandatory slots in order to ensure that all neighboring UEs are able to exchange data and reduce their impact to full-sensing UEs. In other words, this can be considered as confining the partial sensing UEs to a subset of the slots in order for the partial sensing UEs to exchange information and also reduce their impact on full sensing UEs, avoiding potential collisions.

The same or a similar procedure can also be applied to UEs performing random resource selection, such that they can be required to be receiving during the mandatory slots or they can be only confined to randomly select their transmission resources within the mandatory slots or a combination thereof.

DRX information can also be exchanged between neighboring UEs in the mandatory slots (e.g., when the mandatory slots are a subset of the DRX on duration and when the DRX cycles are not aligned among neighboring UEs).

As described above, in accordance with Technique 2, a set of mandatory slots (e.g., periodic) may be pre-configured for each resource pool during which the partial sensing UEs are required to be receiving. The periodicity of the mandatory slots and the number of mandatory slots per period can dynamically change and depend on multiple parameters (e.g., traffic priority, CBR).

Partial sensing UEs may be required to select their resource selection window within the mandatory slots in order to ensure that their TBs can be received by neighboring UEs.

Further, UEs performing random resource selection may be required to receive during the mandatory slots in order to receive TBs of neighboring UEs.

UEs performing random resource selection may be required to randomly select their resources within the mandatory slots so that they can reach the neighboring UEs.

DRX information may be exchanged between neighboring UEs in the mandatory slots in some scenarios (e.g., when mandatory slots are a subset of the DRX on duration).

Further, the mandatory slots can partially or fully overlap the DRX ON duration, and thus, the mandatory slot configuration can be either the same or a subset of the DRX configuration (e.g., the subset of the DRX duration that is shared among all UEs).

Figure 6:
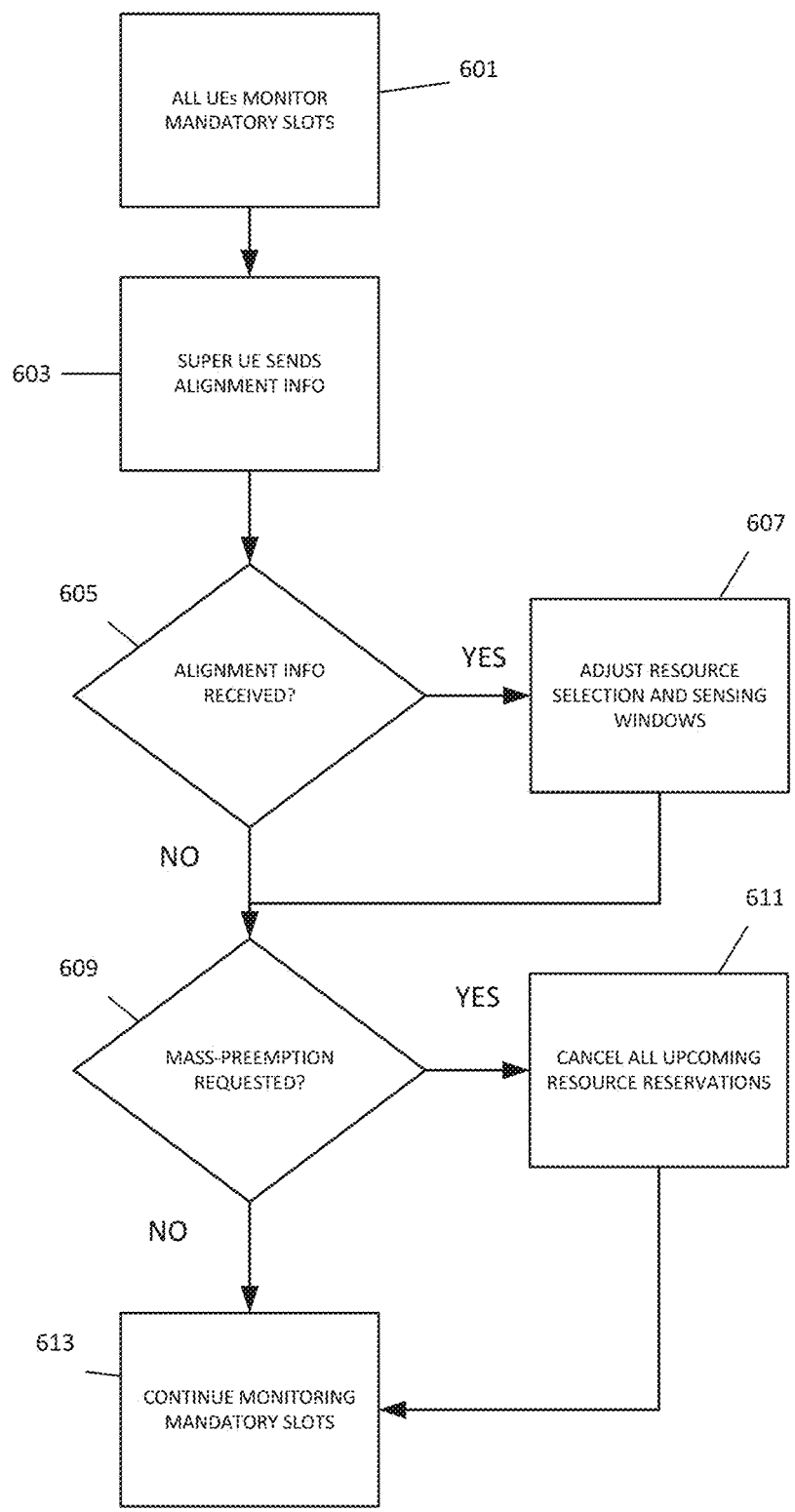
FIG. 6 is flowchart illustrating a method using mandatory slots according to an embodiment.

FIG. 6 is flowchart illustrating a method using mandatory slots according to an embodiment.

Referring to FIG. 6, in step 601, all of the UEs monitor pre-configured mandatory slots. For example, the mandatory slots can be pre-configured with a given periodicity per resource pool as described above.

In step 603, a super UE sends alignment information in the mandatory slots.

In step 605, each of the UEs determines whether the alignment information is received in the monitored mandatory slots.

When a UE receives the alignment information in the monitored mandatory slots in step 605, the UE adjusts the sensing and resource selection windows based on the alignment information received in mandatory slots in step 607.

In step 609, each of the UEs determines whether a mass pre-emption request is received in the monitored mandatory slots. As described above, the super UE may request mass pre-emption for all the UEs within the same geographical area for a given window, or target only a subset of the UEs.

When a UE receives the mass pre-emption request in the monitored mandatory slots in step 609, the UE cancels all upcoming resource reservations in step 611.

In step 615, the UEs continues monitoring the mandatory slots.

4. Pre-Emption Procedure Enhancements for Partial Sensing UEs

In NR V2X Rel-16, pre-emption was introduced to allow higher priority UEs to acquire resources already reserved by lower priority UEs, which helps reduce latency and improves the reliability of higher priority UEs by reducing collisions. However, this procedure relies on the fact that all of the UEs are full sensing UEs, and thus, able to receive pre-emption requests sent by their neighbors. However, this is not the case for partial sensing UEs, and thus, the pre-emption procedure should be updated.

In addition, when partial sensing UEs are pre-empted, they may require a longer duration to find suitable resources for their transmission, and thus, can incur large delays.

In accordance with an embodiment of the disclosure, different enhancements to the pre-emption procedure are described below for partial sensing UEs.

In some cases, a full sensing UE may pre-empt resources selected by a PUE that is performing partial sensing to preserve power. For example, the full sensing UE can have a higher priority traffic with a tight delay budget. In this case, the PUE will be required to redo the partial sensing procedure in order to find alternative resources, which consumes a large amount of power and incurs long delays.

In addition, due to the limited sensing capabilities of a PUE, there is a chance that the selected resources can be occupied by other UEs, resulting in collisions.

Accordingly, to address these drawbacks, a pre-empting, full sensing UE may reserve replacement resources for a PUE at a later point in time. This can be done explicitly through SCI signaling, if the selected resource is within the signaling window. In this case, the SCI may include a flag (either implicit or explicit) that the future resources indicated in the SCI are for replacement to the ones taken from the pre-empted UE(s). This information can be carried in the pre-empting SCI before the pre-empted slot or in the SCI sent in the pre-empted slot.

Alternatively, the pre-empting UE can indicate suggested resources for the power limited UE as a MAC CE, if the selected resources, irrespective of the alternate resources, are within or beyond the signaling window. The MAC CE can be carried in the payload sent in the pre-empted slot or in a slot that triggers the pre-emption.

As described above, in accordance with an embodiment of the disclosure, in case of pre-emption of a PUE by a full sensing UE, the full sensing UE may provide replacement resources to the PUE. The provided resources can be signaled in the SCI along with a flag (either implicit or explicit) or can be sent in a PSSCH by a MAC CE.

Figure 7:
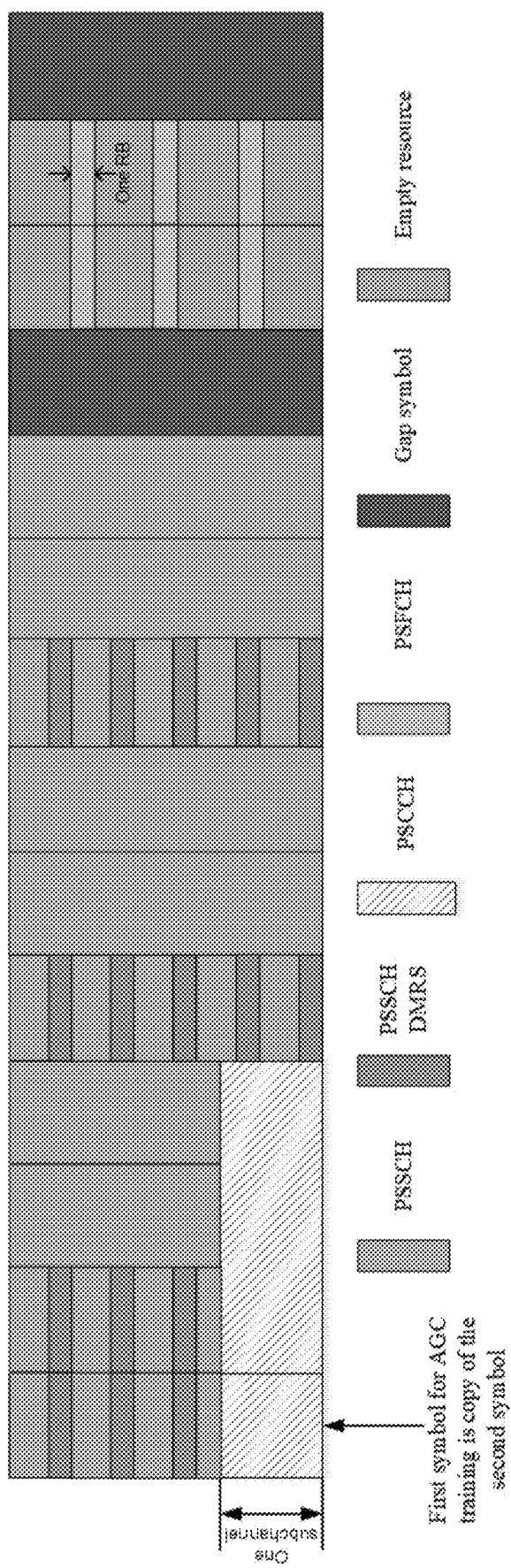
FIG. 7 illustrates a transmission configuration for a pre-empting UE to provide replacement resources to a pre-empted PUE according to an embodiment.

FIG. 7 illustrates a transmission configuration for a pre-empting UE to provide replacement resources to a pre-empted PUE according to an embodiment.

Referring to FIG. 7, replacement resources can be indicated in SCI (i.e., in the control channel (PSCCH)) or as a MAC CE (i.e., in the data channel (PSSCH)). Additionally, a flag indicating that future reservations are replacement resources can be included in $1^{st}$ or $2^{nd}$ stage SCI (either explicitly or implicitly).

Despite the advantages of resource pre-emption of NR Rel-16, it may not be readily implementable for partial sensing because, a low priority PUE may not be receiving at all slots, and thus, may miss the pre-emption request. To address this drawback, in accordance with an embodiment of the disclosure, one or more slots may be specified in which the PUE can expect to receive the pre-emption request. That is, a PUE may monitor only a subset of slots after resource selection.

These slots can be either at or before slot m-$T_3$, where m is the pre-empted slot and $T_3$ is the minimum time required to process the pre-emption request. These slots can also be pre-configured per resource pool. The number of slots can depend on the priority of the transmission. In this case, before each transmission, the UE is expected to monitor one or more slots for pre-emption. These slots can be different from the mandatory slot described above.

In these specific slots, the PUE monitors the subchannels for pre-emption triggering. This trigger can be carried in a PSCCH (e.g., as a resource reservation indication in SCI), in a PSSCH (e.g., as a MAC CE), or in a PSFCH (e.g., in the form of a reserved sequence or a specified sequence offset). The trigger can also be indicated in the slots which are to be monitored by all UEs for Tx/Rx alignment (e.g., the RSU can trigger a mass pre-emption for a given duration to allow higher priority traffic to pass with minimal collisions in emergency cases).

The pre-emption triggering can also come from another UE, other than the one that needs the resources. For example, a UE A may want to pre-empt the resources of a UE C, but is not able to transmit in the predefined monitored slots for pre-emption because they are occupied by another high priority transmission of a UE B. For example, if the UE C is a UE with limited power and monitoring for pre-emption only in a subset of slots which are occupied, the UE A cannot send its pre-emption request. In this case, the UE B can trigger the pre-emption on behalf of the UE A, if it detects the potential collision.

More specifically, the UE B can pre-empt the UE C by sending a pre-emption request, either on the PSCCH or the PSSCH. When using the PSCCH, the UE B can reserve the future resources occupied by the UE C and send a flag (either implicit or explicit) in the SCI to indicate that this pre-emption is on behalf of another UE.

Alternatively, the UE B can send a MAC CE in the PSSCH that indicates the future resources and requests a pre-emption. In this case, the UE B can also indicate the priority and source ID of the UE requesting the pre-emption (i.e., the UE A). The UE B can proactively request the pre-emption on behalf of the UE when the priority of the UE A is higher than that of the UE C or when the priority of the UE A is higher than a certain threshold and is higher than that of the UE C (i.e., provide assistance only for very high priority UEs).

Alternatively, this can be done by a request from the UE A. In particular, the UE A can send a flag to indicate an assistance request when it is not able to deliver the pre-emption request to the UE C in the slots monitored by the UE C for pre-emption.

Figure 8:
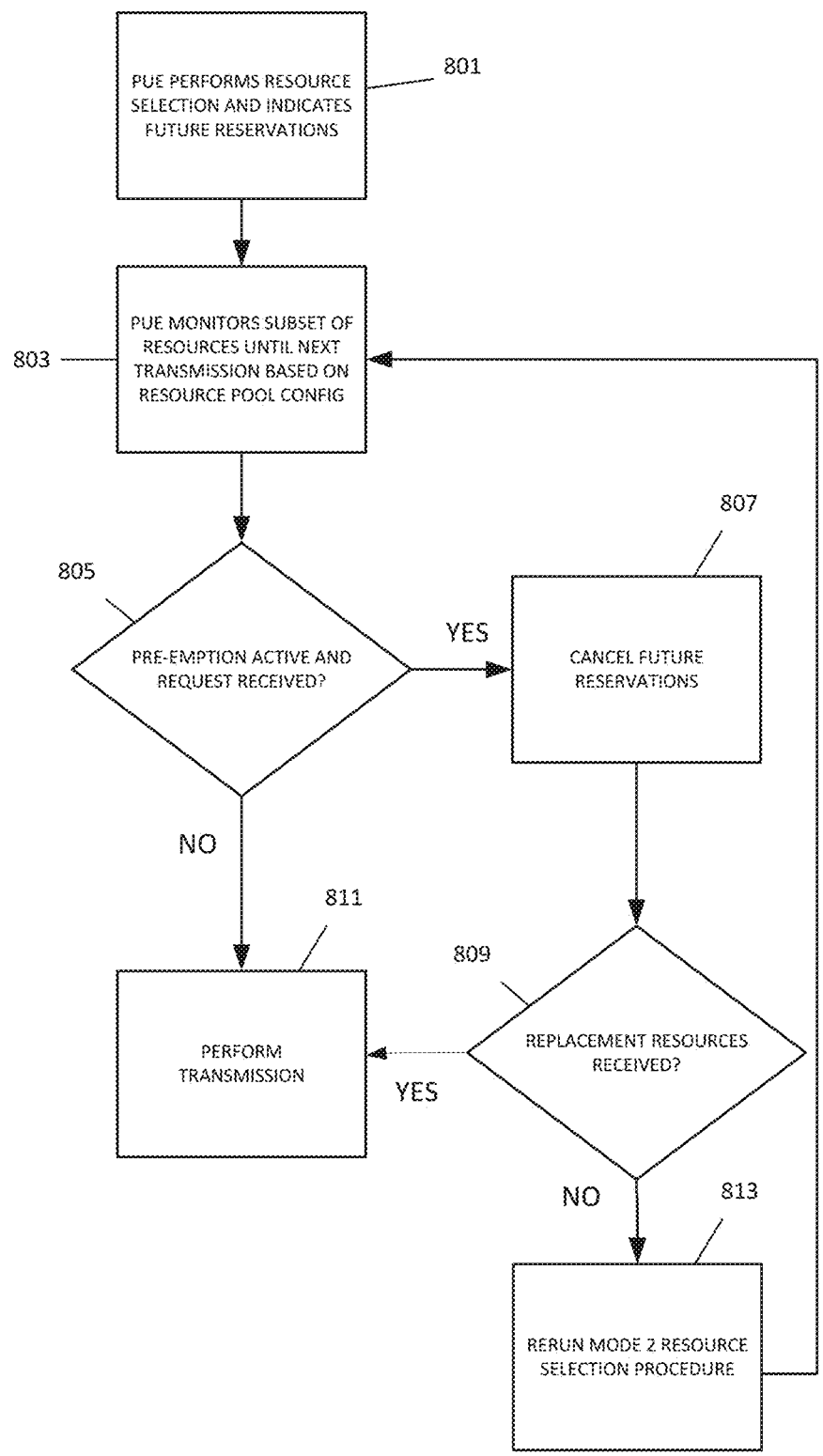
FIG. 8 is flowchart illustrating a method of pre-emption of a PUE monitoring only a subset of slots after resource selection according to an embodiment.

FIG. 8 is flowchart illustrating a method of pre-emption of a PUE monitoring only a subset of slots after resource selection according to an embodiment.

Referring to FIG. 8, in step 801, the PUE performs resource selection and indicates future reservations. Thereafter, in step 803, the PUE monitors a subset of the resources until a next transmission based on a resource pool configuration.

In step 805, prior to the next transmission, the PUE determines if pre-emption is active or if a pre-emption request has been received in the monitored slots.

When pre-emption is not active and no pre-emption request has been received in the monitored slots in step 805, the PUE performs the transmission in step 811.

However, when pre-emption is active or a pre-emption request has been received in the monitored slots in step 805, the PUE cancels future reservations in step 807. Thereafter, in step 809, the PUE determines if replacement resources have been received.

When the replacement resources have been received in step 809, the PUE performs the transmission in step 811 using the replacement resources.

However, when no replacement resources have been received in step 809, the PUE reruns a Mode 2 resource selection procedure in step 813, and monitor a subset of resources again in step 803.

As described above, in accordance with an embodiment of the disclosure, in case of pre-emption of a PUE, one or more slots may be specified to be monitored by the PUE for pre-emption triggering. These slots can be pre-configured per resource pool. A neighboring UE may assist in sending a pre-emption request on behalf of the pre-empting UE, when the pre-empting UE is not able to transmit in the resources monitored by the PUE for pre-emption request. The pre-emption assistance can be done proactively or in response to a request from the pre-empting UE. The pre-emption assistance can be sent over the SCI or the PSSCH as a MAC CE.

Additionally, despite the advantages of resource pre-emption and resource reselection procedures of NR Rel-16, they may lead a PUE to monitor an unnecessary slot, thereby resulting in unnecessary power consumption. To address this drawback, activation/deactivation of pre-emption and resource reselection checking may be controlled based on traffic priority, power level, and CBR. In particular, when the transmission priority of the PUE is the highest, it may not be necessary to check for pre-emption or resource reselection, and thus, it is better to sleep and preserve power. In addition, when the CBR is below a certain threshold, it may become highly unlikely to have a pre-emption or a resource reselection trigger, and thus, the UE may skip the monitoring in order to preserve power. Additionally, when the power level of the UE is below a certain threshold, it may be necessary to preserve the remaining power of the UE, and thus, it may be possible to skip the monitoring of pre-emption and resource reselection triggers. This activation/deactivation of pre-emption and resource reselection monitoring can be performed by the UE itself (e.g., based on its power level) or it can be performed at a resource pool level (e.g., when the CBR is below a certain threshold).

As described above, in accordance with an embodiment of the disclosure, each PUE can activate/deactivate the monitoring of pre-emption and resource reselection triggers based on CBR, power level, and/or priority. The activation/deactivation of pre-emption and resource reselection monitoring can also be done at the UE level or for all UEs in a given resource pool.

5. Wake-Up/Sleep Signaling for PUEs

In some cases, it may be beneficial to exchange wake-up/sleep (WUS) signals between UEs in order to ensure packet reception or to preserve power. For example, a first UE can signal to a second UE to continue sensing and avoid going to sleep when new payloads are expected to be transmitted in the near future. Alternatively, a sleep signal can be sent to allow an Rx UE to sleep earlier, in order to preserve power, when no new payloads are expected in the near future. A Tx UE can also indicate a next sensing window to an Rx UE before it goes to sleep (i.e., provide the duration of the sleep) in order to ensure that they are time aligned.

The exchange of these WUSs can be either done by a physical (PHY) layer or by a higher layer. In particular, $1^{st}$ stage or $2^{nd}$ stage SCI can carry a field to indicate to an Rx UE to either stay awake or to sleep. For example, a 1-bit field can be added to the $1^{st}$ or $2^{nd}$ stage SCI to indicate a wake-up signal when it is set to 1 and a sleep signal otherwise. If extra bits are available, they can be used to indicate a suggested duration of a wake-up or a suggested sleep-duration. Alternatively, these extra bits can indicate an index to a table that carries a set of wake-up or sleep durations.

To pre-reserve the SCI bits, the sleep or wake-up durations can be also indicated implicitly by setting one or more fields in the $1^{st}$ stage SCI or $2^{nd}$ stage SCI to predefined values or the sleep or wake-up durations can be pre-configured per resource pool. When the sleep or wake-up durations are pre-configured per resource pool, the SCI will only need to carry the wake-up/sleep indication.

Alternatively, the wake-up/sleep signals can also be carried in the PSSCH (e.g., as a MAC CE). In this case a 1-bit field can be added to indicate a wake-up signal when it is set to 1 and sleep signal otherwise. If extra bits are available, they can be used to indicate a suggested duration of the wake-up or sleep-duration or to indicate an index to a table that carries a set of wake-up or sleep durations.

The WUS indication can be also used by a super UE to preserve power of one or more categories of UEs. For example, a super UE can send a sleep request in a mandatory slot that overrides a previously signaled receiving and resource selection windows for a given duration in time. This request can also be sent in special cases and for only one or more UE categories (e.g., sensors placed on the road). In this case, the wake-up/sleep indication may be used to preserve the power of these UE categories.

The impact of WUS indications on alignment between Tx and Rx UEs should also be considered. This issue may be more pronounced when the Rx UE is expected to receive data from more than one neighboring UEs. In particular, requesting a UE to sleep can reduce/eliminate its receiving window, and thus, potentially hinder its ability to receive TBs from other UEs. In addition, requesting the UE to sleep can also prevent the UE from performing adequate sensing to identify its resource selection window.

If a UE is requested to wake-up for a given duration, this indicates that it will be receiving a TB during this wake-up time. Hence, it may be beneficial to avoid transmitting during this period in order not to lose the expected TB. However, this can also impact its resource selection window.

To address these possible issues, the following approaches may be implemented: Impact due to sleep request on:
  Receiving window: In some cases, when an Rx UE is receiving from a Tx UE, the Rx UE may need to exhaust a timer before going to sleep in order not to miss any incoming TBs from the transmitting UE. In this case, the UE can reset the timer related to the Tx UE when it receives a sleep request. However, it may not be allowed to go to sleep until it resets all of the timers associated with all potential Tx UEs. In case of Tx and Rx alignment by a centralized UE (e.g., using the mandatory slot as described above), a UE may be required to stay awake until the end of the receiving/sensing window, even if all timers are reset.
  Sensing and resource selection windows: For transmission, a UE doing partial sensing should perform sensing to identify the occupancy of candidate resources in its resource selection window. In this case, a UE may disregard a sleep request, if it has data to transmit and should perform sensing in order to identify the candidate resources. Impact due to wake-up request on:
  Sensing and resource selection window: A wake up request indicates that data will be arriving in the near future. However, if it overlaps with a resource selection window, a UE may end up losing an incoming TB due to a half-duplex issue. To address this issue, a UE may delay its transmission (if it is delay tolerant) until the incoming TB is received. In this case, the UE may still perform the adequate sensing and identify the candidate slots for transmission, but only consider the candidates that occur after it receives the incoming TB.
  Alternatively, the UE may trigger the sensing and resource selection procedure only after it receives the incoming TB. This type of delaying can also be based on a priority of the UE that sent the wake-up signal.

As described above, in accordance with an embodiment of the disclosure, a wake-up/sleep indication, along with a duration, may be explicitly signaled in $1^{st}$ stage or $2^{nd}$ stage SCI or as a MAC CE in a PSSCH to an Rx UE. In both cases, 1-bit can indicate the wake-up or sleep signal, whereas remaining bits of the field can indicate the wake-up/sleep duration, either explicitly or as an index to a pre-configured table.

The wake-up/sleep indication can be implicitly signaled in the $1^{st}$ stage or $2^{nd}$ stage SCI by setting one or more fields to pre-defined values. In addition, the wake-up/sleep duration can be pre-configured per resource pool.

A super UE may send a wake-up/sleep request (e.g., a mass sleep/wake-up request) in a mandatory slot(s). This request can override previously signaled receiving and resource selection windows and may be applied in special cases or for one or more UE categories (e.g., sensors placed on the road).

A UE can reset a wake-up timer after receiving a sleep request from a neighboring UE. Subsequently, the UE can go to sleep if all wake-up timers are reset, the UE does not have any data to transmit, and the UE is not required to perform sensing/receiving for Tx and Rx alignment When a UE receives a wake-up request to indicate incoming TB(s), it can delay its sensing and resource selection window until the TB is received. Alternatively, it can perform the sensing, but drop the resource selection candidates within the resource selection window before the TB is received.

A distinguishing factor of NR V2X from LTE V2X is the ability to support hybrid automatic repeat request (HARQ) feedback. In particular, after unicast and groupcast transmissions, a UE can enable feedback transmission by the transmitted SCI when it is supported by the resource pool. In this case, an Rx UE will either respond back with an ACK/NACK, in case of unicast and groupcast option 2, and only a NACK, in case of groupcast option 1.

In NR Rel-16, the ACK/NACK feedback comes in slot 'a' which has PSFCH feedback and is at least K slots after the PSSCH transmission, where K is equal to 2 or 3 depending on resource pool configuration.

The PSSCH to PSFCH gap should be considered when deciding the wake-up/sleep duration and also when performing the alignment between the Tx and Rx UEs. In particular, when deciding on the wake-up duration, the UE should make sure that it stays awake long enough after its transmission to receive the HARQ feedback. That is, there are some scenarios in which the UE should be awake and performing sensing after its receiving window ends. Alternatively, after performing its transmission, the UE may elect to sleep, in order to preserve power, and then wake-up before or at the slot in which it expects to receive the HARQ feedback.

In addition, when performing the Tx and Rx alignment, the PSSCH to PSFCH gap should be taken into consideration. In particular, the sensing or receiving duration of the Tx UE must be extended to be long enough and aligned with the Rx UE so that it can receive the PSFCH feedback.

As described above, in accordance with an embodiment of the disclosure, the PSSCH to PSFCH gap should be considered when selecting the wake-up/sleep durations and when performing the Tx/Rx alignment.

6. Handling of Unknown Slots Due to Missed Sensing

For partial sensing, there may be scenarios in which a UE ends up transmitting in some slots within a sensing window. In this case, due to a half-duplex constraint, the UE will not be able to detect SCIs transmitted by neighboring UEs, and thus, may not be able to identify whether one or more of the slots in a resource selection window are occupied or not.

For full sensing, in NR V2X Rel-16, a UE assumes the presence of a hypothetical SCI in slots that it has not monitored. Subsequently, the UE excludes resources in the resource selection window by assuming that all configured periods in a resource pool are received in the hypothetical SCI slot. Despite the advantages of this scheme, it may not be feasible for use with partial sensing as it may result in so many resources being excluded.

To address this drawback, in accordance with an embodiment of the disclosure, a UE excludes resources based on a subset of periods configured in a resource pool. The subset can be designed to include only a periodicity (P) of PUE transmissions that triggered resource selection. Alternatively, the subset can include P and all the configured periodicities that divide P, or the subset can include the most commonly used periodicities in a given geographical area. The subset can also include only the configured periodicities that are smaller than a threshold.

As described above, in accordance with an embodiment of the disclosure, in case a slot is not sensed in a sensing window for partial sensing due to a half-duplex constraint, a UE may exclude resources in a resources selection window corresponding to a subset of periodicities configured in a resource pool.

The periodicities considered for resource exclusion can include one or a combination of a periodicity (P) of a transmission that triggered a resource selection, any configured periodicity in the resource pool that divides P, the most commonly used periodicities in a given geographical area, or configured periodicities that are smaller than a threshold.

As discussed above, a UE may be required to exclude a large number of slots and subchannels when it is not able to sense a slot in its sensing window (e.g., due to the half-duplex constraint). However, an exclusion of such resources may not be necessary for subchannels over which it actually performs transmission.

Figure 9:
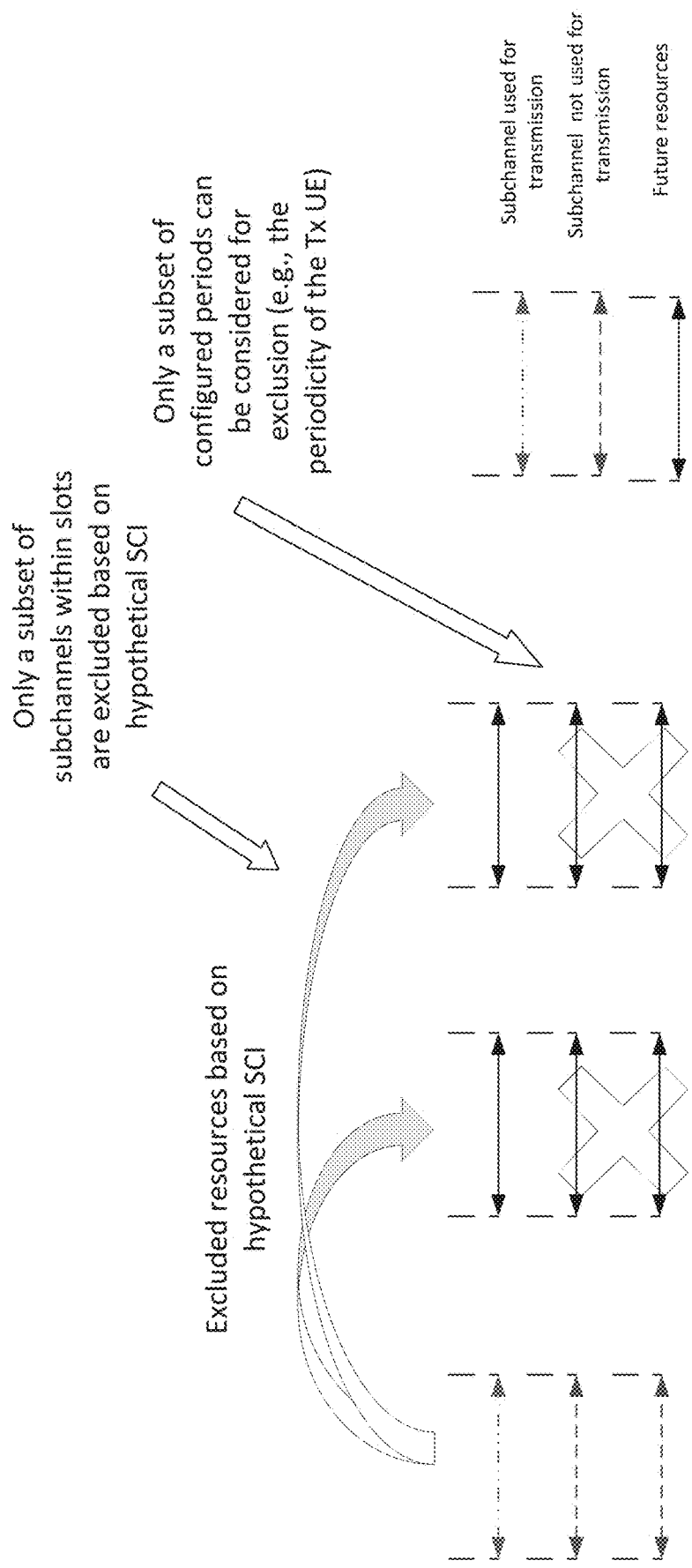
FIG. 9 illustrates an example of resource exclusion based on hypothetical SCI, according to an embodiment.

FIG. 9 illustrates an example of resource exclusion based on hypothetical SCI, according to an embodiment.

Referring to FIG. 9, a resource pool is configured with 3 subchannels and a UE A performs a transmission on subchannel 1 in slot m that falls within its sensing window. Since the UE A has reserved subchannel 1 in this slot and actually did transmit in this slot, then it can be assumed that no other UE was able to send another SCI and/or make a future reservation during slot m in subchannel 1. Therefore, it may be sufficient to assume the presence of the hypothetical SCIs on only the subchannels that the UE A did not use for its own transmission. Subsequently, the resources to be excluded can be reduced.

If a UE occupies all subchannels within a given slot n, it may not need to exclude any of the resources in its resource selection window. This technique may be applied for partial sensing and full sensing UEs.

As described above, in accordance with an embodiment of the disclosure, a UE may not monitor a slot within its sensing window due to being in the Tx mode. In these cases, hypothetical SCIs (and the exclusion of their corresponding resources in the resource selection window) can be assumed in the subchannels that were not occupied by the UE transmission.

Accordingly, less resources may be excluded by excluding only a subset of subchannels within slots in which a UE did not transmit, or excluding only a subset of the configured periodicities for the resource pool.

7. Coexistence of Transmissions Based on Full Sensing with Transmissions Based on Power Saving RA Scheme(s) in a Same Resource Pool To ensure better utilization of a system's resources and avoid resource segmentation, it is expected that NR V2X Rel-17 will allow coexistence between power saving UEs and regular UEs in the same resource pool. However, sharing a resource pool between PUEs and full sensing UEs can impede the system performance.

In particular, a power saving UE using random resource selection or partial sensing can have access to the same resources utilized by full sensing UEs. Despite the advantages of this scheme, it may create a burden on the full sensing UEs by triggering many resource reselections or pre-emptions. In addition, it can also result in many collisions since UEs that use random resource selection may not monitor the resources before accessing them.

Further, separating the resource pool can lead to inefficient utilization of resources when one is dominating the other.

In accordance with an embodiment of the disclosure, to mitigate these drawbacks, a method is provided to dynamically allow/block access of power saving UEs in a resource pool. This type of restriction may be based on a priority of a UE transmission. In particular, UEs performing random resource selection or partial sensing and having a priority above a certain threshold may coexist with full sensing UEs.

This type of restriction may also be based on a measured CBR. For example, coexistence may occur when the measured CBR (in case of partial sensing and full sensing UEs) or the given/pre-configured CBR (in case of UEs performing random resource selection) is above or below a certain threshold.

In addition, a full sensing UEs may be allowed to coexist in resource pools configured with random resource selection or partial sensing, if the CBR is above a certain threshold in other resource pools (i.e., a CBR measurement can be done over one resource pool only) or when its priority is above/below a certain threshold.

Figure 10:
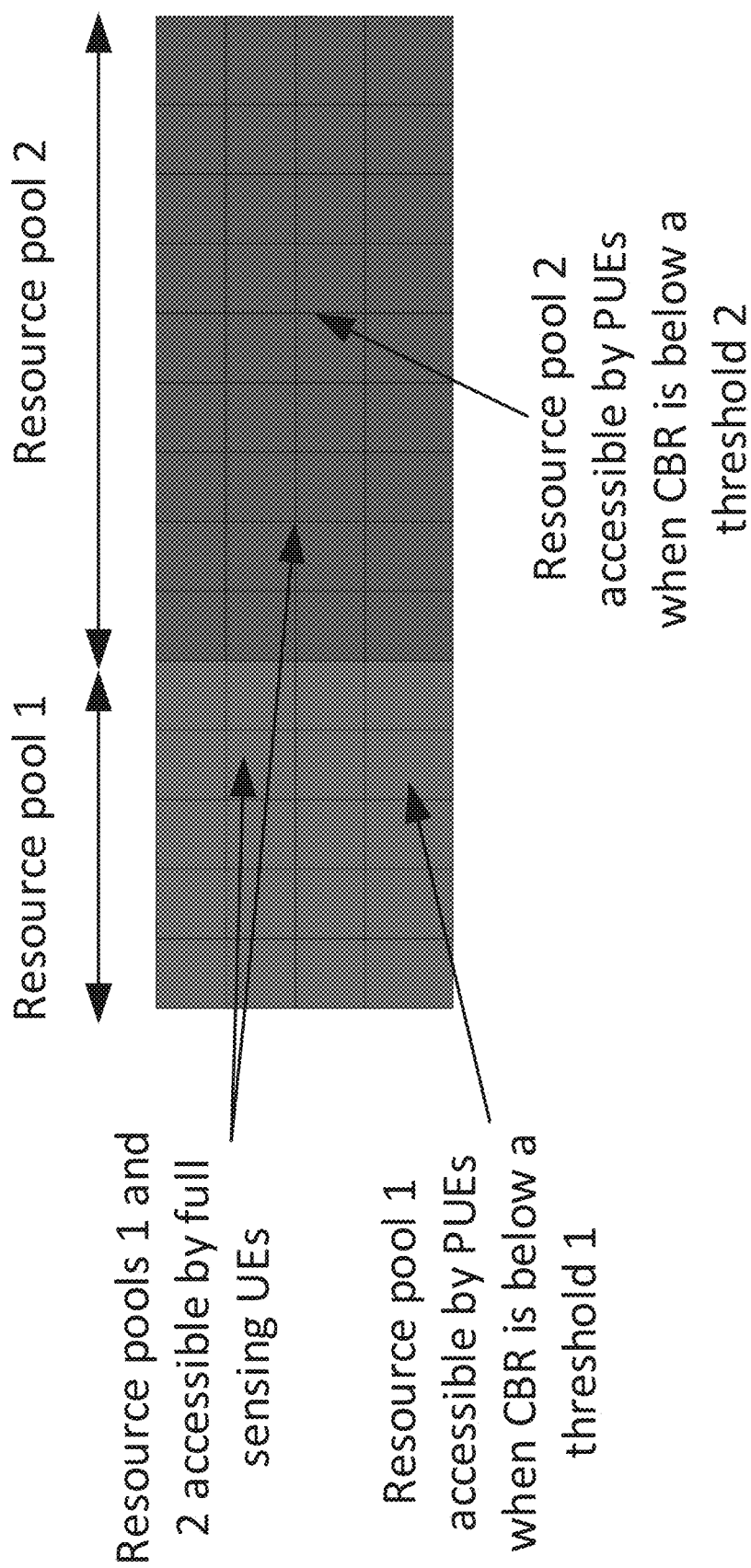
FIG. 10 illustrates an example of dynamic allocation within a resource pool between full sensing UEs and PUEs based on a channel busy ratio (CBR), according to an embodiment.

FIG. 10 illustrates an example of dynamic allocation within a resource pool between full sensing UEs and PUEs based on CBR, according to an embodiment.

Referring to FIG. 10, resource pools 1 and 2 are accessible by full sensing UEs. However, resource pool 1 is accessible by PUEs when CBR is below a $1^{st}$ threshold, and resource pool 2 is accessible by PUEs when CBR is below a $2^{nd}$ threshold.

Another approach to limit the negative impact of coexistence is to limit the power of an initial transmission or subsequent retransmissions of power saving UEs when using a shared resource pool. This approach may be beneficial because the power saving UEs may not perform adequate sensing, and thus, may interfere with higher priority UEs using the same resource pool. The restriction on the transmit power may be based on a transmission priority.

Additionally, PUEs may be allowed to increase their priority indication in SCI in order to reduce chances of pre-emption.

For example, a pre-configured increase may be defined for each priority level to prevent pre-emption of power saving UEs when coexisting with full sensing ones. Some priority levels may be increased by a value bigger than other priority levels. In addition, the pre-configured increase may also depend on resource allocation techniques (e.g., a random resource selection can have a higher priority increase than a partial sensing).

As described above, in accordance with an embodiment of the disclosure, the coexistence of power saving UEs with full sensing UE may dynamically allowed/blocked in one or more resource pools. The restriction for coexistence between full sensing and power saving UEs in one or more resource pool can be based on the measured/obtained/pre-configured CBR being above or below a certain threshold and/or a priority of a UE transmission being above a certain threshold.

A CBR may be measured only over one or more resource pools, rather than all configured resource pools, and the accessible resource pools may be determined accordingly.

The transmit power of an initial transmission or subsequent transmissions of power saving UEs may be limited, when using a shared resource pool with full sensing UEs. This restriction can depend on the transmission priority of the power saving UEs.

The power saving UEs may increase priority levels of their transmissions in order to prevent pre-emption by full sensing UEs. This increase can be done separately for each priority level and can depend on the resource allocation technique (e.g., random resource allocation can be treated separately than partial sensing UEs).

8. Congestion Control Support for Power Saving Based RA

In LTE and NR V2X, congestion control mechanisms may be used to reduce collisions between neighboring UEs when utilizing a Mode 2 resource selection procedure. In particular, two congestion control metrics (i.e., CBR and channel occupancy ratio (CR)) are defined, whereby the CBR measures the number of resources within a given window with an RSSI above a certain threshold. Based on the measured CBR, the UE obtains a $CR_{Limit}$, which governs how many resources a UE can occupy within a given window. The $CR_{Limit}$ will depend on priority.

In particular, the UE measures a CR that includes the resources it has consumed and resources to be consumed with a given window and compares it against its $CR_{Limit}$. If the measured CR is below the $CR_{Limit}$, then the UE can proceed with its transmission. Despite the advantages of these mechanisms, they are not readily applicable for when no or limited sensing is considered (e.g., random resource selection or partial sensing). To address this issue, in LTE V2X, when partial sensing or random resource selection is used and the sensing information is not available, the UE uses a pre-configured CBR value in order to obtain its $CR_{Limit}$. However, despite the simplicity of this technique, it may not be readily applicable for NR V2X due to its tight reliability and latency constraints.

In accordance with an embodiment of the disclosure, to address this concern, a value of CBR for partial sensing UEs may be redefined and based on a sensed duration with a given validity. In particular, if a UE only measured 100 slots out of the previous 1000 slots, then its CBR value should be adjusted to consider only the 100 measured slots.

In addition, the validity of the measured CBR should be constrained with a timer. Once the timer has expired, the UE can fall back to a preconfigured value of CBR, if no new measurements are available.

In addition, to ensure the quality of the measured CBR, it can be considered as valid only if a certain number of slots are monitored within the CBR measurement window.

Multiple CBR values may be pre-configured per resource pool. Subsequently, the UE can dynamically select one of these pre-configured CBR values when measurements are not available (e.g., based on its priority or its last measured CBR if it is not too old).

As described above, in accordance with an embodiment of the disclosure, a value of a CBR may be redefined to consider only resources that fall in the measured slots within the CBR measurement window, in case of partial sensing.

Additionally, a CBR validity timer may be defined, whereby the UE utilizes a pre-configured CBR value once the timer expires, if no updated CBR is obtained through measurements.

Further, a measured CBR may be considered valid if the number of measured slots within the CBR measurement window is above a certain threshold.

Multiple CBR values may be preconfigured per resource pool and a UE may dynamically select one of these values, e.g., based on the UE's priority, its previous CBR measurements, or the number of monitored slots and their occupancy, if these slots are below a threshold, to provide a valid CBR.

9. Impact of Partial/No Sensing on Resource Re-Selection and Pre-Emption Triggering In NR V2X Rel-16, resource re-selection and pre-emption mechanisms were introduced to reduce collisions between neighboring UEs. In particular, after a UE selects a resource and before signaling it to neighboring UEs in an SCI, the UE continuously performs sensing. During this period, if the UE identifies that a resource was reserved by a neighboring UE, then it triggers a resource re-selection in order to find a different resource and avoid the possible collision.

Similarly, after a UE indicates that it reserved a future resource and before the actual transmission, the UE continuously performs sensing. During this period, if the UE detects that a neighboring UE with a given priority above a threshold reserved the same resource, it triggers resource re-selection and considers the conflicting resource as pre-empted.

An advantage of these mechanisms is that the number of potential collisions between neighboring UEs can be reduced as compared to LTE V2X. However, for these mechanisms to work properly, the UE performs sensing in order to identify the conflicting resources. However, the implementation of these schemes may not be straight forward, especially in scenarios in which the UE performs partial/opportunistic sensing for resource selection or when a UE that is capable of continuously sensing the subchannels performs random resource selection (e.g., to meet a strict packet delay budget, save power, or reduce the complexity of resource selection).

In order to address these issues in accordance with an embodiment of the disclosure, the following 3 sensing categories will be described, based on when the UE performs random resource selection and how sensing is done.

I. A UE continuously/partially/opportunistically senses after random resource selection only for this transmission opportunity Before going into the details of this category, the following is highlighted:

When a trigger occurs at slot n, a UE randomly selects a resource for transmission and then performs sensing for resource re-selection/pre-emption. In this case, the sensing information is available only after random resource selection. Herein, this sensing information is referred to as the one belonging to the current sensing interval and occurs after resource selection.

When another trigger occurs at slot m>n, a UE randomly selects a resource for transmission. Subsequently, the UE performs sensing for resource re-selection/pre-emption. However, since slot m occurs after n, some sensing information may be available due to sensing after slot n, despite that this sensing is not triggered by the incoming trigger at slot m. This information can be used to enhance the random resource selection process or for resource re-selection/pre-emption. Herein, this additional sensing information is referred to as sensing information belonging to previous transmission intervals.

In this category, a current approach is that a UE randomly selects resources for transmission based on its incoming packet (e.g., packet size and priority) without considering previous sensing results (i.e., sensing information not belonging to previous transmission intervals). Subsequently, the UE relies only on resource re-selection and pre-emption for collision avoidance. However, a UE may only be able to partially detect aperiodic/periodic future resource reservations by its neighbors, and thus, there is still a potential for collisions. This can happen due to 1) the future periodic/aperiodic traffic of one of its neighbors was indicated at a slot n before the random resource selection trigger, or 2) a UE may miss future resource indication due to partial or opportunistic sensing.

Alternatively, a UE may utilize sensing information from previous sensing intervals for resource re-selection and pre-emption. However, a more effective way in utilizing this information is updating the resource selection set in order to avoid selecting a conflicting resource rather than reselecting/pre-empting afterwards.

To address these drawbacks, in accordance with an embodiment of the disclosure, the following approaches are provided:

Random selection indication: Include a random resource selection indication, either implicitly or explicitly, in the SCI (i.e., in either $1^{st}$ stage or $2^{nd}$ stage SCI). For an explicit indication, an additional field (e.g., 1-bit) can be added to either the $1^{st}$ or $2^{nd}$ stage SCI to indicate that these resources were randomly selected, thus suggesting to other UEs to avoid these resources even if they have higher priority.

Alternatively, the indication can be done implicitly by setting one or more SCI fields to specific values. This indication is not limited to the power-limited UEs and can be used by full sensing UEs that elect to perform random resource selection.

Periodic traffic sensing gap: Restrict a UE to randomly select a resource that is at least X slots after a slot at which a random resource selection occurs. The objective of this gap is to allow the UE to perform sensing before transmission, thus allowing the UE to perform resource reselection and pre-emption to avoid potential collisions. For example, this gap can be based on the longest configured period per resource pool to avoid all collisions.

Alternatively, the gap can be set to be equal to a specific threshold in order to avoid collisions with all periods smaller than the selected threshold.

The gap can also be configured based on traffic priority or the most commonly used period in the resource pool by traffic type. The threshold can also depend on the measured/configured CBR value.

Aperiodic traffic sensing gap: Restrict a UE to randomly select a resource that is at least Y slots after a slot at which a random resource selection has occurred. The objective of this gap is to allow the UE to sense aperiodic traffic reservations in order to avoid potential collisions with aperiodic traffic by resource re-selection or pre-emption. For example, the gap can be set to Y=32 slots, if the resource selection window is equal to 32 in order to avoid 100% collisions or can be set to Y=16 slots in order to avoid 50% collisions.

The selection of the gap can also be based on the traffic priority and level of congestion (e.g., it can be higher when the system is congested with higher measured/configured CBR value or lower when the traffic has higher priority).

Sensing intensity adjustment: For partial/opportunistic sensing, a UE may be required to increase its sensing intensity (i.e., the number of sensed slots in a given duration) in order to detect potential collisions. This change can be based on traffic priority and a level of congestion (i.e., measured or pre-configured CBR).

Usage of sensing information from previous transmission intervals when performing random resource selection: Before random resource selection, a UE may be required to adjust its random resource selection set to account for previous sensing information from previous intervals, if available. This information may be based on sensing done for previous transmission triggers.

II. UE continuously/partially/opportunistically senses before random resource selection Unlike the previous category, UEs can perform sensing before resource selection. In particular, sensing can occur between a triggering event and before a random resource selection. Herein, this sensing is referred to as the sensing belonging to this interval. This sensing does not preclude the UE from using sensing from previous intervals for random resource selection set adjustment and re-selection/pre-emption triggering.

For example, the UE randomly selects resources for transmission based on its incoming packet. These selected resources are obtained from a set of available resources. This set can be adjusted based on the sensing information obtained before random selection (either in this sensing interval or in previous intervals). However, in both cases, collisions can occur (e.g., if some slots are not monitored in case of partial/opportunistic sensing and thus the neighboring UEs reservations can't be avoided). Additionally, even if sensing is applied, possible collisions can also result in collisions as future resource reservations that were signaled before the triggering event are not considered.

To address these drawbacks, in accordance with an embodiment of the disclosure, the following approaches are provided.

Random resource selection set adjustment: Adjust a random resource selection set to avoid potential collisions with neighboring UEs. This can also be done based on priority.

For example, only resources occupied with high priority UEs can be excluded from the set of resources for random resource selection. This adjustment will be based either on the sensing information belonging to this interval or the sensing information belonging to previous intervals if they are close enough in time.

Resource-reselection/pre-emption triggering after resource selection. In this case, after random resource selection, a UE may be required to trigger resource re-selection/pre-emption to avoid potential collisions. This reselection/pre-emption can be based on sensing obtained before the resource selection trigger (i.e., belonging to previous intervals) or after trigger and before random resource selection (i.e., the sensing information belonging to this interval). The triggering of reselection/pre-emption can also be based on priority.

III. UE continuously/partially/opportunistically senses before and after resource selection for this transmission opportunity In this case, a UE performs sensing for the current transmission interval as follows:
 After triggering event and before random resource selection; and
 After random resource selection for pre-emption and resource re-selection.

Despite this sensing, a UE may still fail to detect resource reservations of neighboring UEs, thus resulting in collisions.

To address this drawback, in accordance with an embodiment of the disclosure, the following approaches are provided:

Sensing intensity adjustment: For partial/opportunistic sensing, a UE may be required to increase its sensing intensity (i.e., the number of sensed slots in a given duration) for a specific duration before or after the random resource selection. The objective of this switch is to try to detect as many potential collisions as possible. This switch may also be dependent on a gap between a resource selection trigger and a randomly selected resource.

This switch may also depend on a priority and level of congestion (i.e., measured or pre-configured CBR). Even if a UE switches to full sensing, it may not be possible to avoid all collisions since the neighboring UEs indicated reservation can be done before the resource selection trigger. To avoid all collisions, the UE is required to randomly select a resource that is sufficiently far in time to allow for enough sensing after resource selection.

As described above, in accordance with an embodiment of the disclosure, a UE may flag random resource selections, either implicitly or explicitly, in $1^{st}$ or $2^{nd}$ stage SCI. Subsequently, neighboring UEs can avoid such resource reservations to avoid potential conflicts even if they have higher priority.

When performing random resource selection, the UE may be required to use resources that are at least X slots away from a slot in which it performs random resource selection in order to allow for periodic traffic sensing. This X slot gap can be based on configured periodicities or the traffic priority or the congestion level (e.g., measured/configured CBR).

Alternatively, the UE may be required to use resources that are at least Y slots away from a slot in which it performs random resource selection in order to allow for aperiodic traffic sensing. This Y slot gap can be based on traffic priority or the congestion level (e.g., measured/configured CBR).

The UE may temporarily adjust its sensing intensity (i.e., number of sensed slots in a given duration) to be able to detect potential collisions. This adjustment can be done after random resource selection and be based on gap duration, priority, and/or congestion level.

A UE may use the sensing information from previous transmission intervals to adjust its random resource selection set, in order to avoid potential collisions. This can also depend on the priority of the traffic.

Resource re-selection/pre-emption triggering may occur after random resource selection based on sensing information obtained in previous transmission intervals.

10. Techniques for CBR Calculation and Selection of Y Candidate Slots for Partial Sensing Unlike in Rel-16 NR V2X, some UEs (e.g., PUEs), in order to save power, may not be continuously monitoring all slots. These UEs may select a sub-set of Y slots in a selection window. A minimum allowed value of Y is (pre)configured and given by parameter minNumCandidateSF. If a slot $t_y^{SL}$ is included in the sub-set of Y slots, the UE shall monitor any slot subframe $t_{y-k \times P_{step}}^{SL}$, if the k-th bit of the high layer parameter gapCandidateSenrsing is set to 1, where $P_{step}$ is the step size and is set to 100 in LTE Rel 14 FDD mode and different values for TDD. The standard does not specify how to select Y slots and how to set the is in the bit-map parameter gapCandidateSensing. Accordingly, it may be up to the PUE to randomly select the Y slots and this may be suboptimal if the system is congested (higher chance of collision).

To address this issue, in accordance with an embodiment of the disclosure, a system may perform full sensing followed by a number of partial sensings, e.g., as illustrated in FIG. 7.

Figure 11:
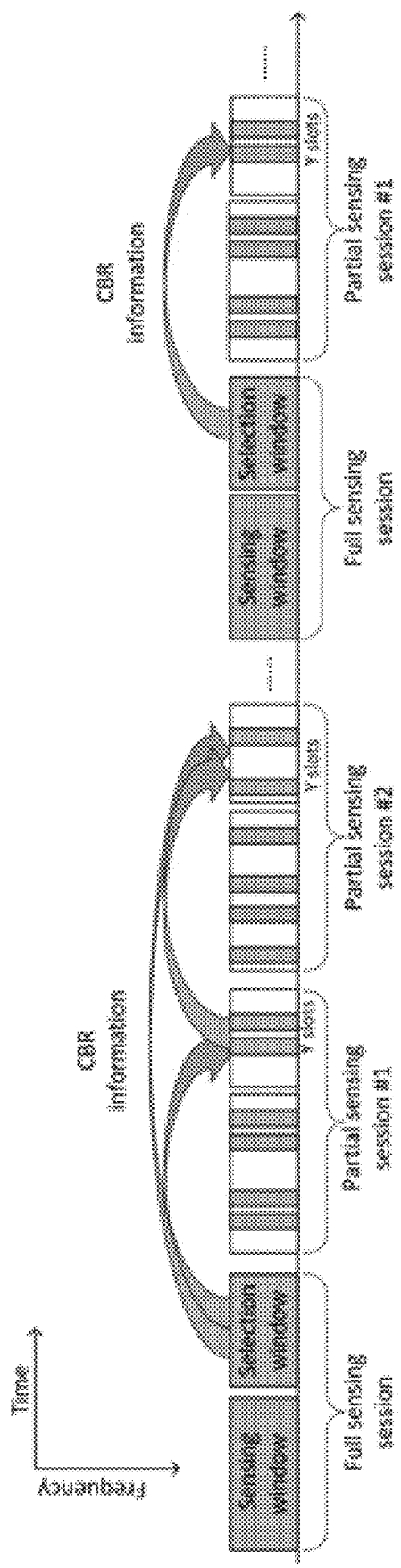
FIG. 11 illustrates a full sensing and a partial sensing approach according to an embodiment.

FIG. 11 illustrates a full sensing and a partial sensing approach according to an embodiment.

Referring to FIG. 11, during the full sensing session, the UE monitors all slots for a given duration and obtains the system CBR and busy ratio for each slot (i.e., the number of occupied subchannels in a slot over the number of subchannels in a slot, herein after referred to as "slot-level CBR") in the selection window. This information is stored and used in the subsequent partial sensing sessions. More specifically, in each partial sensing session, a. The system CBR is used to adjust the number of Is in the bit-map parameter gapCandidateSensinrg. For example, a UE can increase the number of monitored sensing occasions (a sensing occasion is a set of Y monitored slots corresponding to a set bit in the bit map of K) if CBR is relatively high, and vice versa.

b. A UE can sort the slots in the selection window by slot-level CBR, and pick the Y slots with minimum slot-level CBR values. By selecting the least busy slots, the probability of collision with another UE is reduced.

The slot-level CBR may change in each partial sensing session since the available resources in each slot may change after each sensing and selection. Therefore, the Y slots may be different in each partial sensing session.

The number of partial sensing sessions after one full sensing can be adjusted according to the power requirement and entails a tradeoff between system tracking accuracy and the amount of power saving.

In an extreme case in which CBR information is somehow given by a higher layer, the full sensing procedure can be skipped to further save power for the PUE. The full sensing procedure can also be skipped if the CBR detected in previous full sensing session is below a certain threshold.

As described above, in accordance with an embodiment of the disclosure, a full sensing session may be followed by a number of partial sensing sessions. The CBR information from full sensing session is stored and used in the subsequent partial sensing sessions The number of sensing occasions in each partial sensing can be adjusted according to the system CBR. The slots in the selection window can be sorted by the slot-level CBR and a UE selects Y slots with the minimum values in the partial sensing selection window.

The number of partial sensing sessions following each full sensing session can be adjusted according to power requirements. When CBR information is readily given by a higher layer, the full sensing can be skipped. The full sensing can also be skipped if the CBR measured in a previous full sensing period is below a threshold.

Inter-UE coordination may be utilized to improve reliability and latency of a resource selection procedure. In particular, a UE-B may request assistance for resource allocation from a UE-A, and in response, the UE-A may send a set of resources recommended (e.g., a white-list) or not recommended (e.g., black-list) to the UE-B. How to use this 'set of resources' for the UE-B is still under discussion.

If the UE-B is undergoing partial sensing, it may select the sub-set of Y slots in the selection window based on the assistance feedback from the UE-A. More specifically, the UE-B may sort the slots by the number of white-listed or black-listed subchannels in each slot, and then select Y slots with maximum white-listed subchannels or minimum black-listed subchannels. These Y candidate slots should be advantageous over randomly selected slots since it contains the information from target UE assistance.

Alternatively, another approach may be implemented to include/exclude certain slot(s) based on the UE assistance feedback. A slot may be included in the Y sub-set selection, if the number of white-listed subchannels in this slot is above a threshold, or a slot may be excluded from the Y sub-set, if the number of black-listed subchannels in this slot is above a threshold.

As described above, in accordance with an embodiment of the disclosure, when a partial sensing UE is requesting UE assistance, the UE may select Y slots with the most white-listed subchannels or with the least black-listed subchannels as the candidate slots in the selection window.

A partial sensing UE may include/exclude a slot in the Y sub-set of selected slots, if the number of white-listed/black-listed subchannels in the slot is above a threshold.

A scenario that may cost extra power is that a partial sensing UE wakes up frequently to monitor slots in a sensing window. This issue becomes more pronounced when the UE has a sub-set of distributed slots in a selected window.

In accordance with an embodiment of the disclosure, a simple solution is to limit the sub-set to contain contiguous slots only. This may also save messaging overhead, if this UE is providing resource selection assistance to other UE.

11. Wake-Up Duration Extension for Retransmission and Cross-Slot Scheduling

In partial sensing, a UE monitors only slots corresponding to a sub-set of candidate slots in a selection window, and remains asleep/idle for the rest of the slots. However, this may cause an issue if an Rx UE is sending a NACK message to request a re-transmission from another UE, since the re-transmission may be transmitted in a slot that the UE is not monitoring.

In accordance with an embodiment of the disclosure, to obviate this issue, an Rx UE may remain awake until it receives a re-transmission and successfully decodes the packet. When the Rx UE knows the slot of the re-transmission, it only needs to wake up and monitor that slot.

Alternatively, the Rx UE can give assistance to a Tx UE by sending a resource suggestion in slots that the Rx UE is monitoring.

As described above, in accordance with an embodiment of the disclosure, a partial sensing UE requesting a re-transmission may remain wake until it receives a retransmission and successfully detects a packet or until a maximum wake time is reached. The partial sensing UE may wake up and monitor a specific slot for re-transmission, if this slot is known to the UE.

Additionally, an Rx UE may give assistance to a Tx UE by sending a resource suggestion in slots that the Rx UE is monitoring.

Cross-slot scheduling has also been used in NR Uu for power saving purposes.

When a UE receives symbols carrying a PDCCH, it does not need to receive the symbols for a PDSCH of the same slot, since the scheduled PDSCH should be in a later slot. Accordingly, some proposals have adopted the same idea to NR SL by indicating a time slot offset between $2^{nd}$ SCI and data from that of $1^{st}$ SCI. However, if a PUE undertaking partial sensing is a target UE for a transmission and it successfully decodes the $1^{st}$ SCI message in one slot, it may not monitor the corresponding slot of the $2^{nd}$ SCI and data, and therefore, it fails to receive and decode the packet.

To solve this problem, in accordance with an embodiment of the disclosure, a partial sensing UE may wake up and monitor a slot for a transmission of $2^{nd}$ SCI and data, even though this slot is not one of the monitoring slots in a sensing window. That is, if cross-slot is enabled for SL and a partial sensing PUE detects a $1^{st}$ SCI in a slot, the PUE may wake up and monitor the slot for the corresponding slot of $2^{nd}$ SCI and data, even though this slot is not one of the monitoring slots in the sensing window.

Figure 12:
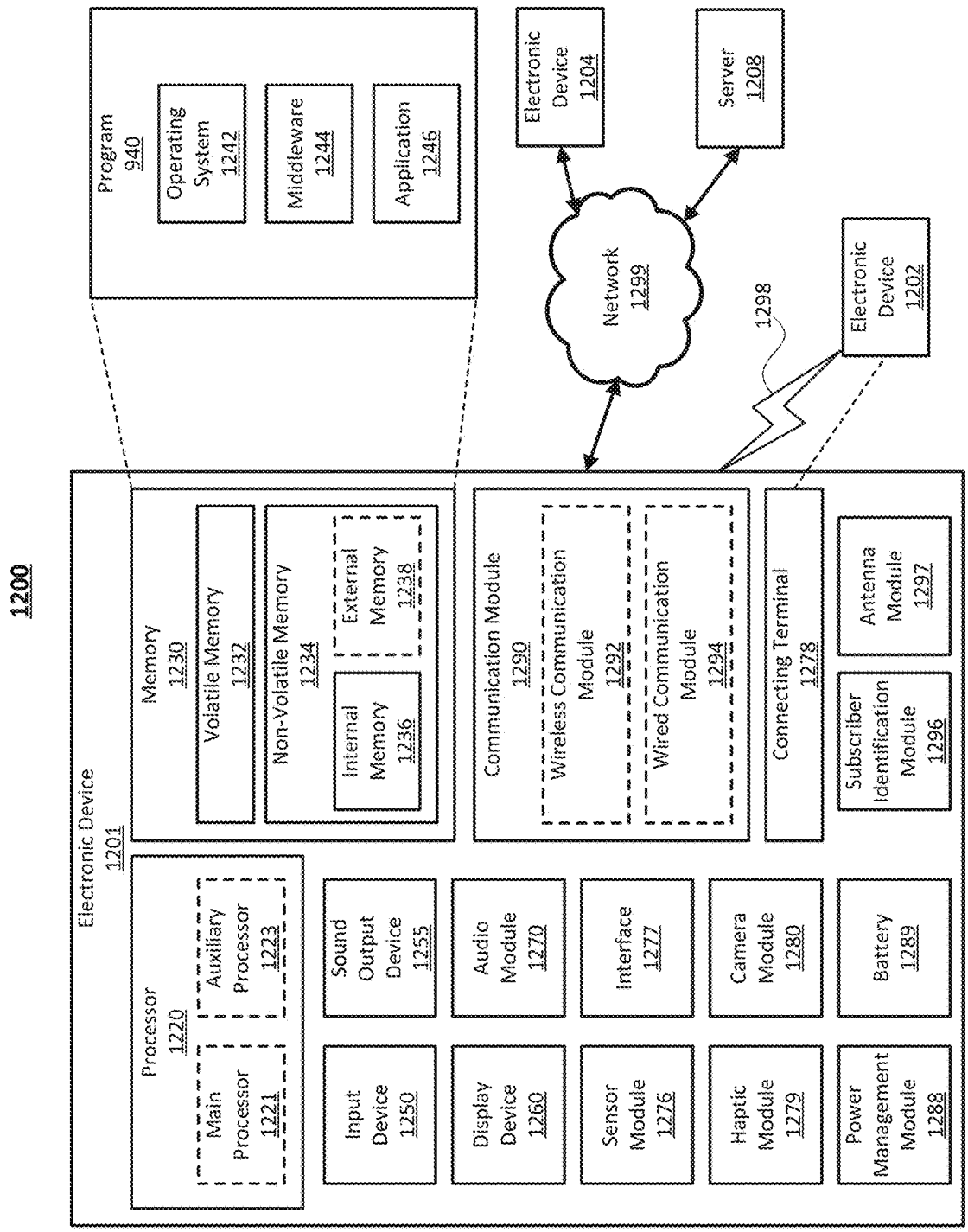
FIG. 12 illustrates an electronic device in a network environment, according to an embodiment.

FIG. 12 illustrates an electronic device in a network environment, according to an embodiment.

Referring to FIG. 12, the electronic device 1201, e.g., a mobile terminal including GPS functionality, in the network environment 1200 may communicate with an electronic device 1202 via a first network 1298 (e.g., a short-range wireless communication network), or an electronic device 1204 or a server 1208 via a second network 1299 (e.g., a long-range wireless communication network). The electronic device 1201 may communicate with the electronic device 1204 via the server 1208. The electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297 including a GNSS antenna. In one embodiment, at least one (e.g., the display device 1260 or the camera module 1280) of the components may be omitted from the electronic device 1201, or one or more other components may be added to the electronic device 1201. In one embodiment, some of the components may be implemented as a single integrated circuit (IC). For example, the sensor module 1276 (e.g., a fingerprint sensor, an iris sensor, or an illuminance sensor) may be embedded in the display device 1260 (e.g., a display).

The processor 1220 may execute, for example, software (e.g., a program 1240) to control at least one other component (e.g., a hardware or a software component) of the electronic device 1201 coupled with the processor 1220, and may perform various data processing or computations. As at least part of the data processing or computations, the processor 1220 may load a command or data received from another component (e.g., the sensor module 1276 or the communication module 1290) in volatile memory 1232, process the command or the data stored in the volatile memory 1232, and store resulting data in non-volatile memory 1234. The processor 1220 may include a main processor 1221 (e.g., a central processing unit (CPU) or an application processor, and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or execute a particular function. The auxiliary processor 1223 may be implemented as being separate from, or a part of, the main processor 1221.

The auxiliary processor 1223 may control at least some of the functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to one embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to one embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to one embodiment, the audio module 1270 may obtain the sound via the input device 1250, or output the sound via the sound output device 1255 or a headphone of an external electronic device 1202 directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device 1202 directly (e.g., wiredly) or wirelessly. According to one embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device 1202. According to one embodiment, the connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or an electrical stimulus which may be recognized by a user via tactile sensation or kinesthetic sensation. According to one embodiment, the haptic module 1279 may include, for example, a motor, a piezoelectric element, or an electrical stimulator.

The camera module 1280 may capture a still image or moving images. According to one embodiment, the camera module 1280 may include one or more lenses, image sensors, image signal processors, or flashes.

The power management module 1288 may manage power supplied to the electronic device 1201. The power management module 1288 may be implemented as at least part of, for example, a power management integrated circuit (PMIC).

The battery 1289 may supply power to at least one component of the electronic device 1201. According to one embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor) and supports a direct (e.g., wired) communication or a wireless communication. According to one embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or a standard of the Infrared Data Association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to one embodiment, the antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. All or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

One embodiment may be implemented as software (e.g., the program 1240) including one or more instructions that are stored in a storage medium (e.g., internal memory 1236 or external memory 1238) that is readable by a machine (e.g., the electronic device 1201). For example, a processor of the electronic device 1201 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

As described above, the embodiments of the disclosure:
1) Allow communication between PUEs by aligning their transmission and reception durations;
2) Provide mass pre-emption to avoid collisions with high priority traffic through mandatory slots;
3) Reduce the sensing burden on PUEs after pre-emption by allowing them to acquire replacement resources from the pre-empting UE;
4) Optimize the sensing duration for pre-emption and resource reselection by partial sensing UEs to preserve their power;
5) Reduce the sensing burden on PUEs by reducing their monitored duration for pre-emption based on traffic priority and CBR;
6) Dynamically enhance the alignment between Tx and Rx UEs for exchanging TBs through wake-up/sleep signaling;
7) Reduce the number of excluded resources due to the half-duplex constraint thus allowing more resources for Step 2 of the Mode 2 resource selection mechanism, thereby reducing chances of collisions and allowing the UE to meet its packet delay budget (PDB);
8) Provide better alignment between neighboring UEs through the exchange of DRX information in mandatory slot (either from super UE to all neighboring UEs or between neighboring UEs);
9) Simplify the signaling of DRX ON cycles when overlapping with the mandatory slots;
10) Dynamically allow/block the coexistence between PUEs and full sensing UEs to render more resources accessible by PUEs while reducing the potential for collisions between the resource reservations of PUEs and full sensing UEs;
11) Allow the usage of a more accurate CBR value for partial sensing UEs unlike LTE which uses a pre-configured value that is not related to the actual system occupancy level;

12) Reduce the probability of a PUE to be pre-empted by a full sensing UE through SCI indication of their limited power status;
13) Reduce collisions between partial sensing UEs and periodic/aperiodic traffic reservations of their neighbors by mandating minimum separation between consecutive transmissions to allow for pre-emption and resource reselection triggering;
14) Allow UEs to obtain a more accurate estimate of the CBR value by oscillating between full and partial sensing; and
15) Allow UEs to have a better set of Y candidate slots for resource selection by relying on CBR measurements thereby reducing the chances of collisions.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method performed by a partial sensing user equipment (UE), the method comprising:
    measuring resources within a first window;
    determining a number of the measured resources having a received signal strength indication (RSSI) greater than a first threshold;
    determining a channel busy ratio (CBR) based on the measured number of resources; and
    determining a channel occupancy ratio (CR) limit based on the determined CBR and transmission priority,
    wherein determining the CBR based on the measured number of resources comprises:
        comparing a total number of measured resources within the first window to a second threshold; and
        performing at least one of (a) or (b):
            (a) in response to the total number of measured resources within the first window being less than the second threshold, determining the CBR as a pre-configured CBR, and
            (b) in response to the total number of measured resources within the first window being greater than or equal to the second threshold, determining the CBR based on a ratio of the number of the measured resources having the RSSI greater than the first threshold to the total number of measured resources within the first window.

2. The method of claim 1, further comprising:
    measuring a CR of resources within a second window;
    comparing the measured CR to the determined CR limit; and
    performing a transmission, in response to the measured CR being less than the determined CR limit.

3. The method of claim 1, wherein the pre-configured CBR is dynamically selected from among a plurality of CBR values preconfigured for a resource pool.

4. The method of claim 3, wherein the wherein the pre-configured CBR is dynamically selected from among the plurality of CBR values based on a priority of the partial sensing UE.

5. The method of claim 3, wherein the pre-configured CBR is dynamically selected from among the plurality of CBR values based on a last measured CBR.

6. The method of claim 1, wherein the determined CBR is valid for a pre-configured duration.

7. A partial sensing user equipment (UE), the partial sensing UE comprising:
    a transceiver; and
    a processor configured to:
        measure resources within a first window;
        determine a number of the measured resources having a received signal strength indication (RSSI) greater than a first threshold;
        determine a channel busy ratio (CBR) based on the measured number of resources; and
        determine a channel occupancy ratio (CR) limit based on the determined CBR and transmission priority,
    wherein the processor is further configured to determine the CBR based on the measured number of resources by:
        comparing a total number of measured resources within the first window to a second threshold; and
        performing at least one of (a) or (b):
            (a) in response to the total number of measured resources within the first window being less than the second threshold, determining the CBR as a pre-configured CBR, and
            (b) in response to the total number of measured resources within the first window being greater than or equal to the second threshold, determining the CBR based on a ratio of the number of the measured resources having the RSSI greater than the first threshold to the total number of measured resources within the first window.

8. The partial sensing UE of claim 7, wherein the processor is further configured to:
    measure a CR of resources within a second window;
    compare the measured CR to the determined CR limit; and
    perform a transmission, via the transceiver, in response to the measured CR being less than the determined CR limit.

9. The partial sensing UE of claim 7, wherein the pre-configured CBR is dynamically selected from among a plurality of CBR values preconfigured for a resource pool.

10. The partial sensing UE of claim 9, wherein the wherein the pre-configured CBR is dynamically selected from among the plurality of CBR values based on a priority of the partial sensing UE.

11. The partial sensing UE of claim 9, wherein the pre-configured CBR is dynamically selected from among the plurality of CBR values based on a last measured CBR.

12. The partial sensing UE of claim 7, wherein the determined CBR is valid for a pre-configured duration.

13. A partial sensing user equipment (UE), the partial sensing UE comprising:
    a processor; and
    a non-transitory computer readable storage medium storing instructions that, when executed, cause the processor to:
        measure resources within a first window;
        determine a number of the measured resources having a received signal strength indication (RSSI) greater than a first threshold;
        determine a channel busy ratio (CBR) based on the measured number of resources; and
        determine a channel occupancy ratio (CR) limit based on the determined CBR and transmission priority,
    wherein the instructions, when executed, further cause the processor to:
        compare a total number of measured resources within the first window to a second threshold; and perform at least one of (a) or (b):
- (a) in response to the total number of measured resources within the first window being less than the second threshold, determine the CBR as a pre-configured CBR, and
- (b) in response to the total number of measured resources within the first window being greater than or equal to the second threshold, determine the CBR based on a ratio of the number of the measured resources having the RSSI greater than the first threshold to the total number of measured resources within the first window.

14. The partial sensing UE of claim 13, wherein the instructions, when executed, further cause the processor to:
measure a CR of resources within a second window;
compare the measured CR to the determined CR limit; and
perform a transmission, in response to the measured CR being less than the determined CR limit.

15. The partial sensing UE of claim 13, wherein the pre-configured CBR is dynamically selected from among a plurality of CBR values preconfigured for a resource pool.

16. The partial sensing UE of claim 15, wherein the wherein the pre-configured CBR is dynamically selected from among the plurality of CBR values based on a priority of the partial sensing UE.

17. The partial sensing UE of claim 15, wherein the pre-configured CBR is dynamically selected from among the plurality of CBR values based on a last measured CBR.

18. The partial sensing UE of claim 13, wherein the determined CBR is valid for a pre-configured duration.

* * * * *